(12) United States Patent
Frazier et al.

(10) Patent No.: US 12,299,393 B2
(45) Date of Patent: *May 13, 2025

(54) SYSTEMS AND METHODS FOR COLEARNING CUSTOM SYNTACTIC EXPRESSION TYPES FOR SUGGESTING NEXT BEST CORRESPONDENCE IN A COMMUNICATION ENVIRONMENT

(71) Applicant: Cognism Limited, Richmond (GB)

(72) Inventors: Eliot S Frazier, London (GB); James A Hodson, El Cerrito, CA (US); Johannes Julien Frederik Erett, London (GB)

(73) Assignee: Cognism Limited, Richmond (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,938

(22) Filed: Aug. 13, 2023

(65) Prior Publication Data
US 2023/0385549 A1 Nov. 30, 2023

Related U.S. Application Data

(63) Continuation of application No. 17/207,610, filed on Mar. 20, 2021, now Pat. No. 11,727,211, which is a
(Continued)

(51) Int. Cl.
*G06F 40/284* (2020.01)
*G06F 40/30* (2020.01)
(Continued)

(52) U.S. Cl.
CPC ............ *G06F 40/284* (2020.01); *G06F 40/30* (2020.01); *G06N 3/049* (2013.01); *H04L 51/42* (2022.05)

(58) Field of Classification Search
CPC ...... G06F 40/284; G06F 40/30; G06F 40/295; G06F 40/35; G06N 3/049; G06N 3/084; G06N 3/0445; G06N 3/0454; H04L 51/42
See application file for complete search history.

(56) References Cited

U.S. PATENT DOCUMENTS 10,339,925 B1 * 7/2019 Rastrow ................ H04M 3/527
10,497,004 B2 * 12/2019 Shaev ..................... G06F 40/56
(Continued)

*Primary Examiner* — Michael Colucci
(74) *Attorney, Agent, or Firm* — Dickinson Wright PLLC; Hector A. Agdeppa

(57) ABSTRACT

Systems and methods for generating best next communication policies, for a time step of an exchange of electronic documents, fit over historical exchanges, optimizing to maximize a probability of achieving a quantified objective leveraging weighted sampling. In a preferred embodiment an electronic document is segmented whereby each constituent segment is deconstructed as a composition of custom expression varieties, pre-defined to enable fulfilment of an objective within a theme of correspondence, associating each expression with a semantic vector. A set of expression extraction models is trained independently and then a second set with knowledge of parallel label predictions, iterating to convergence. The expression compositions and associated semantic vectors are combined into a single vector for each segment. The segment vectors are appended onto profile vectors for the exchange parties, yielding a time series of profile-content vectors. This series is passed to a neural model, to generate next best correspondence suggestion templates.

20 Claims, 14 Drawing Sheets

Related U.S. Application Data continuation of application No. 17/021,903, filed on Sep. 15, 2020, now Pat. No. 10,997,369.

(51) Int. Cl.
*G06N 3/049* (2023.01)
*H04L 51/42* (2022.01)

(56) References Cited

U.S. PATENT DOCUMENTS

| | | | |
|---|---|---|---|
| 11,100,289 B1* | 8/2021 | Kailasam | G06F 40/30 |
| 2009/0254971 A1* | 10/2009 | Herz | G06Q 30/02 |
| | | | 726/1 |
| 2010/0332286 A1 | 12/2010 | Melamed et al. | |
| 2011/0184729 A1* | 7/2011 | Nam | G06F 16/36 |
| | | | 704/9 |
| 2013/0110766 A1* | 5/2013 | Promhouse | G06F 16/2468 |
| | | | 707/607 |
| 2015/0213372 A1* | 7/2015 | Shah | H04L 51/52 |
| | | | 706/12 |
| 2016/0188297 A1* | 6/2016 | Kuroiwa | G06F 8/73 |
| | | | 717/123 |
| 2018/0137433 A1* | 5/2018 | Devarakonda | G06N 5/022 |
| 2019/0361861 A1* | 11/2019 | Rogynskyy | G06F 11/3024 |
| 2020/0250270 A1* | 8/2020 | Yu | G06F 40/126 |
| 2020/0344194 A1* | 10/2020 | Hosseinisianaki | H04L 51/18 |
| 2020/0349199 A1* | 11/2020 | Jayaraman | G06F 40/284 |
| 2020/0401764 A1* | 12/2020 | Han | G06N 3/0454 |

\* cited by examiner

SYSTEMS AND METHODS FOR COLEARNING CUSTOM SYNTACTIC EXPRESSION TYPES FOR SUGGESTING NEXT BEST CORRESPONDENCE IN A COMMUNICATION ENVIRONMENT

CROSS-REFERENCE TO RELATED APPLICATIONS

This application is a continuation of U.S. patent application Ser. No. 17/207,610 filed Mar. 20, 2021 titled "SYSTEMS AND METHODS FOR COLEARNING CUSTOM SYNTACTIC EXPRESSION TYPES FOR SUGGESTING NEXT BEST CORRESPONDENCE IN A COMMUNICATION ENVIRONMENT", which is a continuation of U.S. patent application Ser. No. 17/021,903 filed Sep. 15, 2020 titled "SYSTEMS AND METHODS TO GENERATE SEQUENTIAL COMMUNICATION ACTION TEMPLATES BY MODELLING COMMUNICATION CHAINS AND OPTIMIZING FOR A QUANTIFIED OBJECTIVE", the entire specifications of which are hereby incorporated by reference in its entirety.

BACKGROUND OF THE INVENTION

Field of the Art

The disclosure relates to the field of electronic document analysis, and more particularly to the field of building structural and semantic characterizations of electronic documents, and modelling these sequentially over chains of documents.

Discussion of the State of the Art

The field of processing electronic documents to quantify qualitative communication is an inherently complex and delicate landscape. Communications comprised within an electronic document demonstrate a plethora of responsiveness trends towards communication styles specific to different business sectors and huge variances in the communication preferences of an author associated to the document. Accordingly, in a sales environment, authors must develop adapted strategies through years of experience with many failed prospects to navigate and direct approaches to maximize their chances of a desired outcome: learning through trial and error which strategies work with which types of individual.

Systems known in the art provide analytics-based policies for document content and styling of email outreach; rules learned and applied homogenously across a universe of outreach. Other machine learning technologies known in the art generate insights about content, tonality, sentiment and latent implications of responses, in order to help prioritize and sort threads of electronic communications. What is missing is technology to assist in the formation of custom winning strategies for outreach; a presently difficult and long-term endeavor.

What is needed is a system and method to deconstruct communications comprised within electronic documents as a combination of constituent expressions and combine a structure of expressions with semantic modeling to provide overall characterization.

What is further needed in the art is a system and method to combine email characterization with objective (that is, a goal or result) data and profile embedding, to learn best next correspondence policies over historical data, optimizing over the entire sequence of communication within an electronic document to maximize a probability of achieving a pre-specified objective.

SUMMARY OF THE INVENTION

Accordingly, the inventor has conceived and reduced to practice, in a preferred embodiment of the invention, systems and methods to generate sequential communication action templates by modelling communication chains and optimizing for a quantified objective. In a preferred embodiment, a system for processing electronic documents to predict a next correspondence over a plurality of text segments comprises a policy generation computer comprising a memory, a processor, and a plurality of programming instructions, the plurality of programming instructions stored in the memory that when executed by processor, cause the processor to receive an electronic document comprising a plurality of text segments arranged in a sequence, receive an objective from a user device, segment the electronic document into the plurality of text segments. For each text segment of the plurality of segments, the policy generation computer generates a first sequence of labels for a plurality of features using one or more independently trained conditional random fields models, the one or more independently trained conditional random fields models associated with a first expression variety of at least one expression variety, the policy generation computer then generates a second sequence of labels for the plurality of features using another trained conditional random fields model, the another trained conditional random fields model associated with the first expression variety wherein the another trained conditional random field model iteratively uses the output of one or more independently trained conditional random field models as augmented feature input to determine one or more interdependencies wherein the iteration generates additional sequences of labels for the plurality of features using the another trained conditional random fields model, each iteration updating the augmented feature input to reflect the output labels of a previous iteration, until a preconfigured convergence criteria is met.

For each expression of the at least one expression, the policy generation computer generates a semantic vector using a semantic model whereby the policy generation computer creates a first pair, of a plurality of pairs, comprising an expression type associated to the expression and a semantic vector associated to the expression then combines the plurality of pairs into a segment vector for the segment, of a plurality of segment vectors wherein to combine the plurality of pairs, a structure of the segment as a decomposition of its constituent expressions with semantic information for the respective expression is encoded. The policy generation computer then vectorizes one or more profiles of senders and recipients to encode characteristics associated with the plurality of segments into a profiles vector, wherein the senders and recipients are each associated with at least one segment of the plurality of segments, concatenates the profiles vector onto each segment vector of the plurality of segment vectors, sequentially feed the plurality of segment vectors into a neural sequence2sequence model to generate one or more next segment vectors, the neural sequence2sequence model previously trained to optimize the objective, decode the one or more next segment vectors into one or more suggestions, decode the one or more next segment vectors into a structure of expressions and corresponding semantic vectors whereby the one or more suggestions comprise a structure, one or more expressions, and a plurality of text associated to the corresponding semantic vectors, further wherein each suggestion of the one or more suggestions correspond to a different segment.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

DETAILED DESCRIPTION

Figure 1:
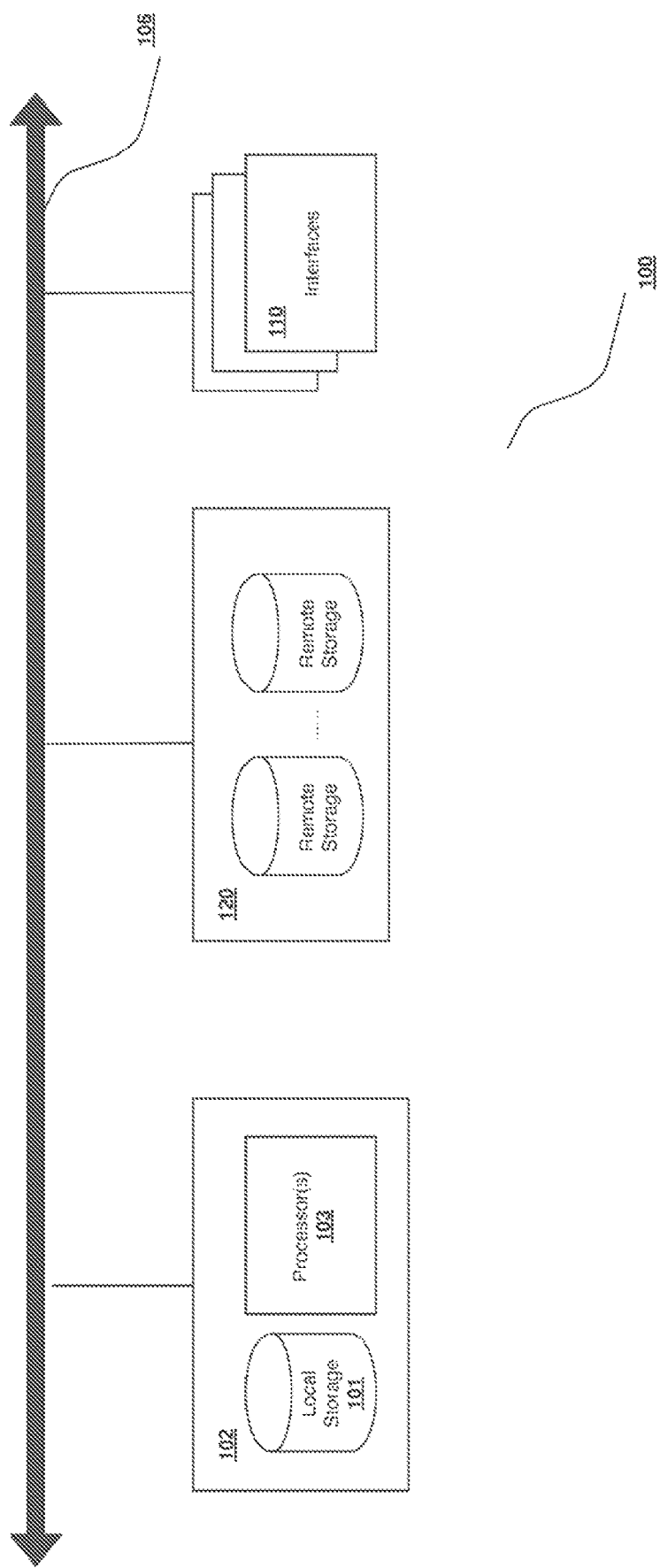
FIG. 1 is a block diagram illustrating an exemplary hardware architecture of a computing device used in an embodiment of the invention.

The inventor has conceived, and reduced to practice, systems and methods to generate sequential communication action templates by modelling communication chains and optimizing for a quantified objective.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular characteristics of one or more of the inventions described herein may be described with reference to one or more particular embodiments or figures that form a part of the present disclosure, and in which are shown, by way of illustration, specific embodiments of one or more of the inventions. It should be appreciated, however, that such characteristics are not limited to usage in the one or more particular embodiments or figures with reference to which they are described. The present disclosure is neither a literal description of all embodiments of one or more of the inventions nor a listing of characteristics of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the characteristics of a device may be alternatively embodied by one or more other devices that are not explicitly described as having such functionality or characteristics. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the characteristics or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the characteristics or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the characteristics or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface (s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the characteristics and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of characteristics or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
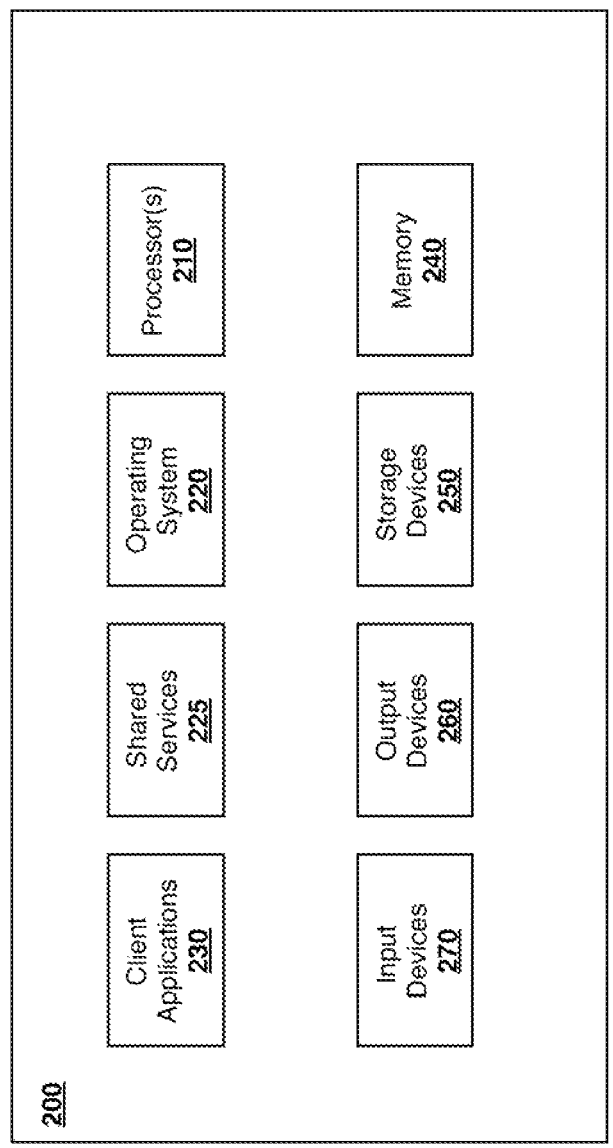
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
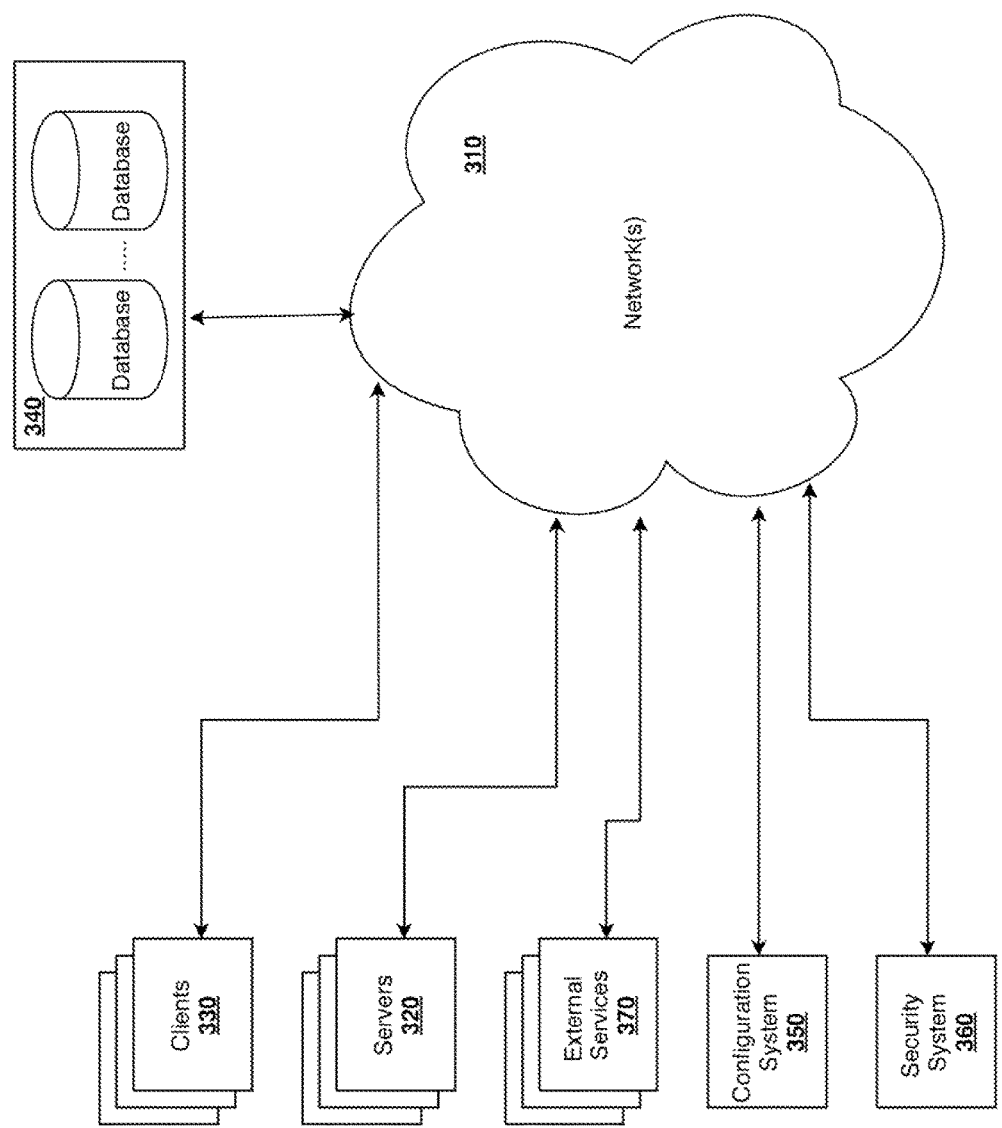
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra™, Google Bigtable™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
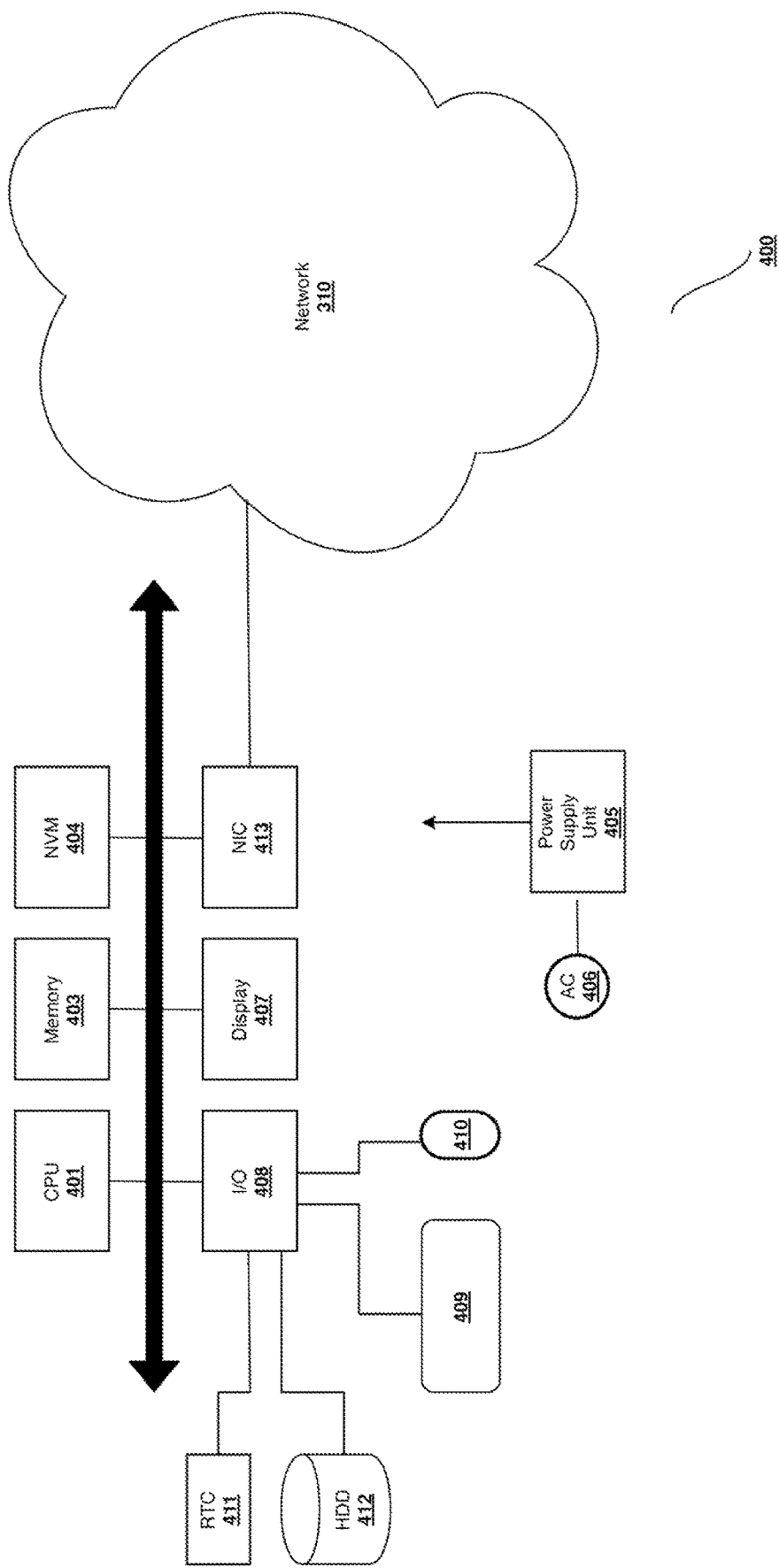
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
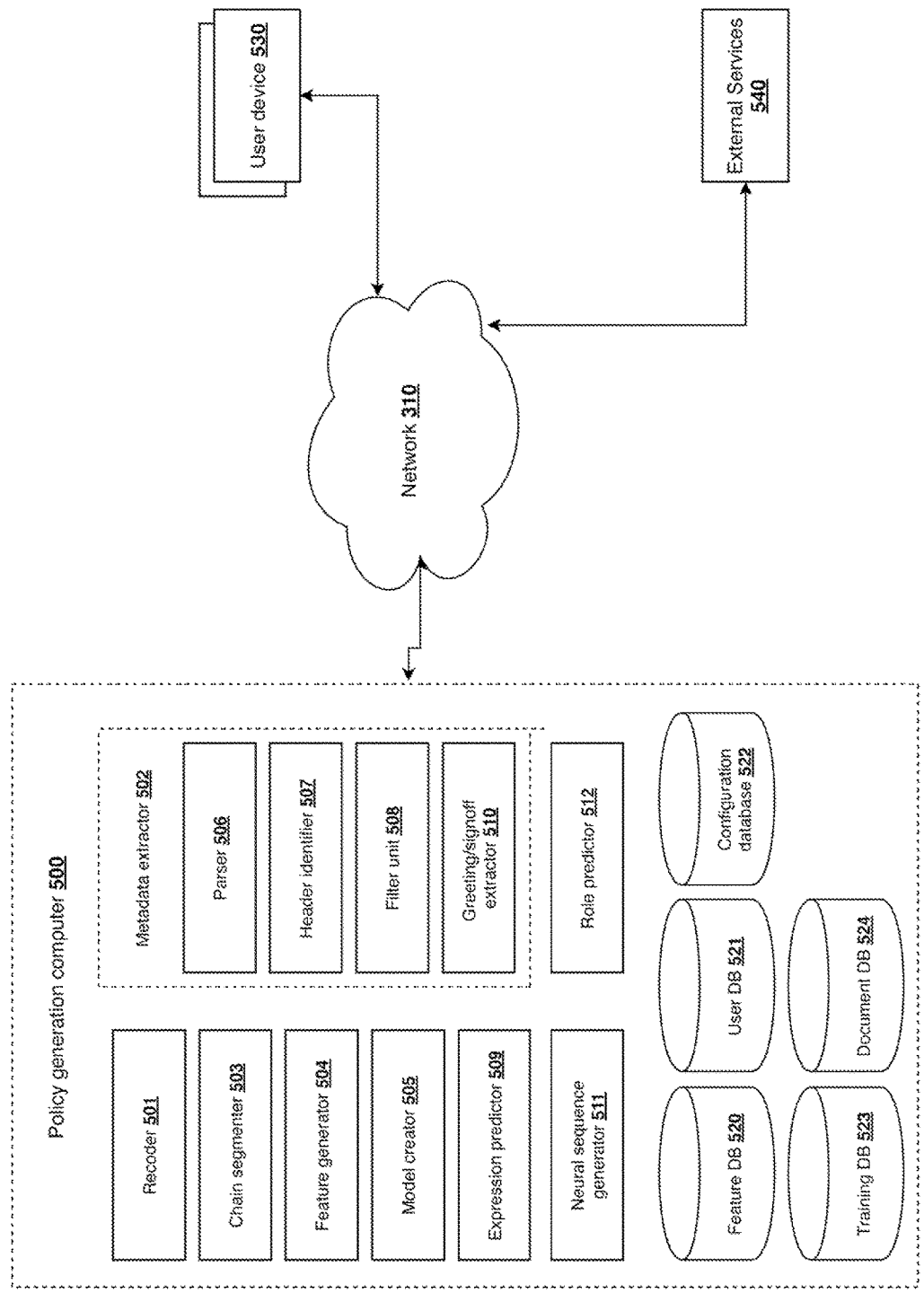
FIG. 5 is block diagram illustrating a data characterization system to identify and locate expression varieties within an electronic document, according to a preferred embodiment of the invention.

FIG. 5 is block diagram illustrating a policy generation system to generate sequential communication action templates by modelling communication chains and optimizing for a quantified objective, according to a preferred embodiment of the invention. According to the embodiment, a policy generation computer 500 comprises a processor 210, memory 240 and a plurality of programming instructions, the plurality of programming instructions stored in memory 240 that when executed by processor 210 cause the processor to identify and locate expression varieties within an electronic document. A policy generation computer 500 further comprises:

Recoder 501 may determine a consistent encoding format comprising character properties, rules for normalization, decomposition, collation, rendering, and the like, for example to a Unicode transformation format such as UTF-8 for the electronic document.

Chain segmenter 503 may use greeting/signoff extractor 510 to identify different section of an electronic document (for example, an email). For example, identifying a sender and receiver and associated roles or actors associated with the different segments of the electronic document.

Feature generator 504 may compute features generated at word, sentence, and/or n-gram levels, as a means for providing additional contextual information for models. Features may inform decisions for a single token (that is, a word) to be categorized as token-level features, context window token-level features, and sentence-level features. Feature generator further creates objects comprising empty sentence arrays, feature objects, and other data types that may comprise multiple properties and methods and/or contain other objects whereby a plurality of features associated with tokens tokenized and stored within feature database 520. In a preferred embodiment, sub word features, shape features, character-level features, and the like, may be generated as well as analysis of prefixes and suffixes of various lengths is performed for tokens associated with a sentence comprised within the electronic document. In a preferred embodiment, explicit information into the casing, length and type of characters which comprise a token may be provided by feature generator 504 and information about a relative position of a word within its encompassing sentence and/or a relative position of a sentence within its encompassing paragraph may be identified and categorized. In some embodiments feature generator 504 may employ k-means agglomeration and semantic embedding models may be created. Feature generator 504 may compute features comprising syntactic dependency parsing, polarity seeking, named entity features, part-of-speech (POS) features, and the like (referring to Table 1)

Model creator 505, in some embodiments, may use a conditional random field (CRF) model to perform tagging to learn contextual sequence relationships and patterns, whereby the properties of the inputs, both prior and subsequent are used in order to characterize input while holding relevance. Model creator 505 may create a machine learning model by learning underlying linguistic/syntactic relationships between custom defined expression categories of a schema using systems and methods disclosed herein. Model creator 505 may generate sequences of labels for sequences of input features and create a model such that expression predictor 509 is operable to extract a custom rubric of expression. It should be appreciated that labeling data typically involves augmenting a set of unlabeled data such that each piece of that unlabeled data is associated with one or more meaningful "tag," "label," or "classification" that is informative or desirable to know. Model creator 505 may learn a variety of clustering models, with different values of k (that is, number of clusters), to create clusters of different granularities to serve as rich semantic features that may aid the model as high-level semantic groups. Model creator 505 may employ a Latent Dirichlet Allocation (LDA) as a generative statistical model to discover a plurality of latent topics within the corpus of training data. In some embodiments, an iterative training approach may be applied, by model creator 505, to reuse knowledge learned by each model independently by creating a second generation set of models. Accordingly, predictions, by expression predictor 509, of the parallel models may be added as features for each token of the electronic document. This enables knowledge learned independently by the models in relation to their own labels, to be shared, and to facilitate learning of underlying relationships between tag varieties. A second set of models which are trained with knowledge of the predicted labels from the other categories may then be utilized to generate a second iteration of predictions. This method may be repeated for convergence. Model creator 505 may learn a semantic model over natural language associated with each expression variety, to pair semantic vectors with each expression variety, accounting for the structural and semantic content of an email. Model creator 505 may learn some semantic modelling for profile attributes, to enable meaningful comparisons of attributes across different users. Model creator 505 may learn a neural sequence generator 511, to learn underlying trends in receptivity to particular correspondence approaches, as measured by a quantified objective, given the prior correspondence chains, and profile information, whereby the training set can be curated to both select only those correspondence chains with the necessary objective data and weigh the number of samples according proportionally to the objective score.

Expression predictor 509 is operable to learn a sub word semantic structure associated with a particular language to extract a custom rubric of expression such that it may predict new latent topics, sentiment, POS, and other features as well as predicting a classification for an actor (or role) for at least a portion of an electronic document.

Neural sequence generator 511, may be trained by model creator 505 using techniques known in the art, such as, using a gradient descent optimization algorithm, minimizing prediction loss (maximizing objective probability), backpropagating to update weights over batches/epochs, to produce a model capable of suggesting best next correspondence policies, given a prior chain or communications and profile information associated with the sender, and objective data tying historical communication chains to their ultimate outcome. In some embodiments, neural sequence generator 511, may use an encoder-decoder architecture, constructed with multiple layers of RNN units (typically GRU or LSTM), whereby the inputs comprise a sequence of vectors which characterize the structure and semantics of each communication segment, alongside information relating to the profiler of the sender/recipient. Neural sequence generator 511, may include infrastructure to support the vectorization of emails over the chain, as well as profiles over the collection of involved parties. Neural sequence generator 511, may possess methods to combine the correspondence and profile vectors into a sequence of combination vectors.

Metadata extractor 502 extracts metadata that may include detected greetings, detected signoffs, detected email headers, parenthetic statements, email addresses, website/image links and the role (or actors) of a sender/recipient associated with an electronic document. Metadata extractor 502 may store extracted metadata into a metadata object. Metadata extractor 502 comprises, at least, greeting/signoff extractor 510 to identify greetings and signoff associated with an electronic document (for example, an email); filter unit 508 for filtering emails, links, numeric data, natural language, and the like (referring to FIG. 9); header identifier 507 may use a predefined sequence of characters to define a search pattern as a find operation to identify one or more email headers.

User database 521 comprises data structures for storing user information such as user profile or other information associated with a user, a sender, or a recipient associated with an electronic document. Configuration database 522 may be used to store system configuration, expression variety categories, themes, target expression varieties, correspondence outcome objectives, and the like. Document database 524 may comprise a plurality of electronic documents. Electronic documents may be emails, chat transcripts from messaging platforms, speech-to-text communications, social network posts, and the like. In some embodiments, instead of processing electronic documents from database 524, systems and methods disclosed herein may receive communications from real-time communication streams such as VoIP communications, POTS communications, and the like. Similarly, user profiles may come from external services 540 instead of database 524, or both. Training database 523 may comprise a plurality of training data such as a large quantity of electronic documents, emails, or other data used to train a Neural Sequence model and a plurality of CRF models, semantic models, and other machine learning models core to the invention.

User device 530 may be a mobile computing device or other computing device to send and receive electronic documents. in some embodiments user device 530 may be used to view an analysis resultant of systems and methods disclosed herein.

External services 540 may be a social network, a messaging service, an email server or some other cloud-based electronic document service that may coordinate, manage, provide, or save electronic documents.

Detailed Description of Exemplary Embodiments

Figure 6:
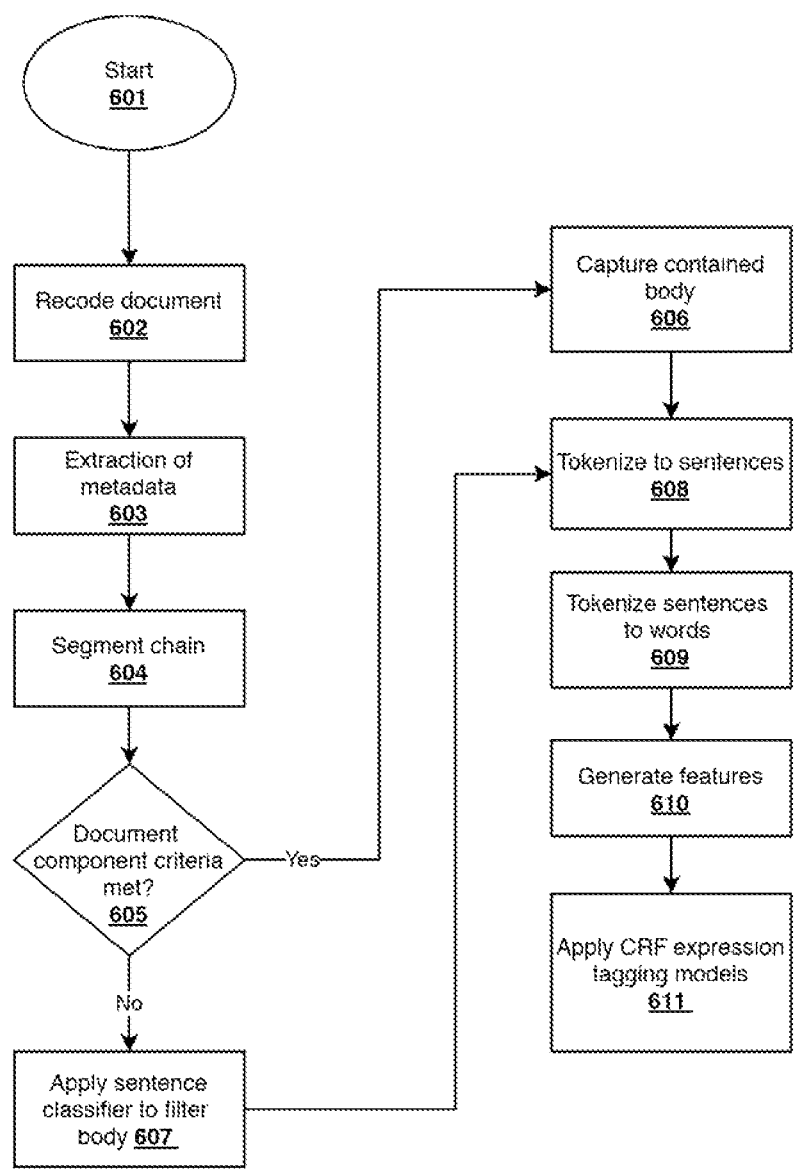
FIG. 6 is flow diagram illustrating a method for identifying and locating expression varieties within an electronic document, according to a preferred embodiment of the invention.

FIG. 6 is flow diagram illustrating a method for identifying and locating expression varieties within an electronic document, according to a preferred embodiment of the invention. According to the embodiment, in a first step 601, a method for identifying and locating expression varieties within electronic data starts by receiving input data such as an electronic document comprising communications. In a preferred embodiment, input data used in the exemplary embodiments may focus primarily around a plurality of segments associated to communications (for example, an email) with a particular objective (for example a sales or marketing related email whereby an objective may be to close a sale), though any electronic document may be processed by systems and methods disclosed herein such as electronic document, streaming data, translated data, data from a database, instant messaging data, and the like. Other exemplary use cases include forum posts, whereby the objective is positive votes, or customer service instant messaging whereby an objective might be a customer satisfaction score. An objective may be pre-configured and received from configuration database 522, or from a user device 530. In a next step 602, the electronic document may be recoded, by recoder 501, to a consistent encoding format comprising character properties, rules for normalization, decomposition, collation, rendering, and the like, for example to a Unicode transformation format such as UTF-8. In a next step 603, metadata is extracted, by metadata extractor 502 whereby extracted metadata may include detected greetings, detected signoffs, detected email headers, parenthetic statements, email addresses, website/image links and a role associated with the sender and/or recipient, and the like. Accordingly, metadata extractor 502 may extract and store extracted metadata into a new or existing metadata object. In a preferred embodiment, metadata detection methods are performed by custom built heuristics, with the greeting and sign off detections superseded by the CRF models for detection of these entities (referring to FIG. 9). In a next step 604, segmentation of the electronic document may be computed by chain segmenter 503 to segment individual communications (that is, individual emails) from its parent thread by identifying and splitting segments based on identified headers. An exemplary header may be as follows:

\*\*From:\*\* Angela <###@emailhouse.com>
\*\*Sent:\*\* Tuesday, Jul. 31, 2018 10:41 AM
\*\*To:\*\* Melissa <###@redcompany.com>
\*\*Subject:\*\* EXT: Re: Talenthouse Red Company Advantageously, headers between electronic documents comprising electronic communications (herein also referred to as email) are typically consistent across service providers, despite their forms being varied, making them ideal for leveraging to this end.

The segmented communication may then be converted by cleaning HTML tags using systems known in the art. In order to prepare the segmented and converted email text into the desired input for the subsequent machine learning models, any junk text comprised within the email may be separated from the main body of text. In an embodiment where an even number of greetings and a sign-offs are detected in the expected order, key text may be isolated by capturing the enclosed regions between the greetings and signoffs, that is, the bodies of the emails.

In a next step 605, chain segmenter 503 determines if greeting signoff criteria has been met. Responsive to the above criterion being fulfilled, positive examples are exploited to generate training data, by collecting both examples of "clean body" text, and "junk" through a reverse process. By collecting a plurality of examples in this way, a simple n-gram feature sentence classifier may be trained to learn types of language commonly associated with each class, and thus perform accurate differentiation between the two. In a preferred embodiment, a random forest classifier may be used to separate key text of interest within an email chain, though there are many classification models that may be used, or, in some embodiments, a custom-built classifier may be used. Subsequent to these processes cleaned isolated bodies of text should remain, and the email body is captured, by metadata extractor 502, in step 606.

Referring again to step 605, if chain segmenter 503 determines that a greeting signoff criteria has not been met, the body of the email may be filtered, in a next step 607, by applying a sentence classifier to the email.

Once the input data has resulted a clean isolated body of text, the body is separated into sentences in step 608. Each sentence is then tokenized. In a preferred embodiment, a spaCy™ Doc structure is used, in step 609 to handle document storage, including its rule-based tokenizer. The Doc container spaCy™ offers advantageous functionalities for token/character tracking and leveraging pre-trained models as a feature source. For each constituent token, features are generated, by feature generator 504, in step 610 (referring to FIG. 7) as well as the surrounding tokens within a defined context window while limited to the bounds of the sentence (referring to FIG. 7). In a preferred embodiment, features may also be generated, by feature generator 504, at a sentence level, as a means for providing additional contextual information to generated models (referring to FIG. 7). Features that may inform decisions for a single token may be categorized, by feature generator 504, as sentence features, context window token-level features, sentence-level features, and the like.

In a preferred embodiment, token level features may comprise the following (Referring to Table 1):

TABLE 1

| | |
|---|---|
| Word Features | Lowercased token.
A collection of prefixes and suffixes.
A Boolean negation feature. This may search previous tokens for any "negation words" appearing directly in advance (within the previous three tokens) to invert the semantics of the token itself.
Vector location within sentence.
Beginning or ending word Boolean.
Word polarities (negative, positive, neutral and compound) derived using the NLTK Sentiment Vader Intensity Analyzer.
Word cluster features: custom trained word2vec brown clusters, custom trained word2vec-kmeans clusters. |
| Shape features | Length of the token, in terms of characters.
Capitalization form.
spaCy ™ shape feature - captures the types of character as well as capitalization form. |
| Syntactic/ Morphological features | Rule-based deterministic lemma - spaCy ™ library.
Part of speech tag - spaCy ™ library.
Granular part of speech tag - spaCy ™ library.
Dependency relationship - spaCy ™ library.
Left edge - spaCy ™ library.
Right edge - spaCy ™ library. |
| N-gram syntactic features | The properties: part-of-speech (POS) tag, granular POS tag and Dependency relation were generated and combined as features for all possible N-gram combinations up to 5 grams. |
| Sentence level features | Sentence length.
Sentence location within paragraph.
Sentence polarities - NLTK Vader ™.
Sentence Topic id - custom trained word2vec and Latent Dirichlet Allocation (LDA) models.
Sentence vector K-means cluster id - custom trained word2vec (Gensim ™) and clustering models (sklearn).
Sentence vector Agglomerative cluster id - custom trained word2vec (Gensim ™) and clustering models (sklearn). |

Figure 7:
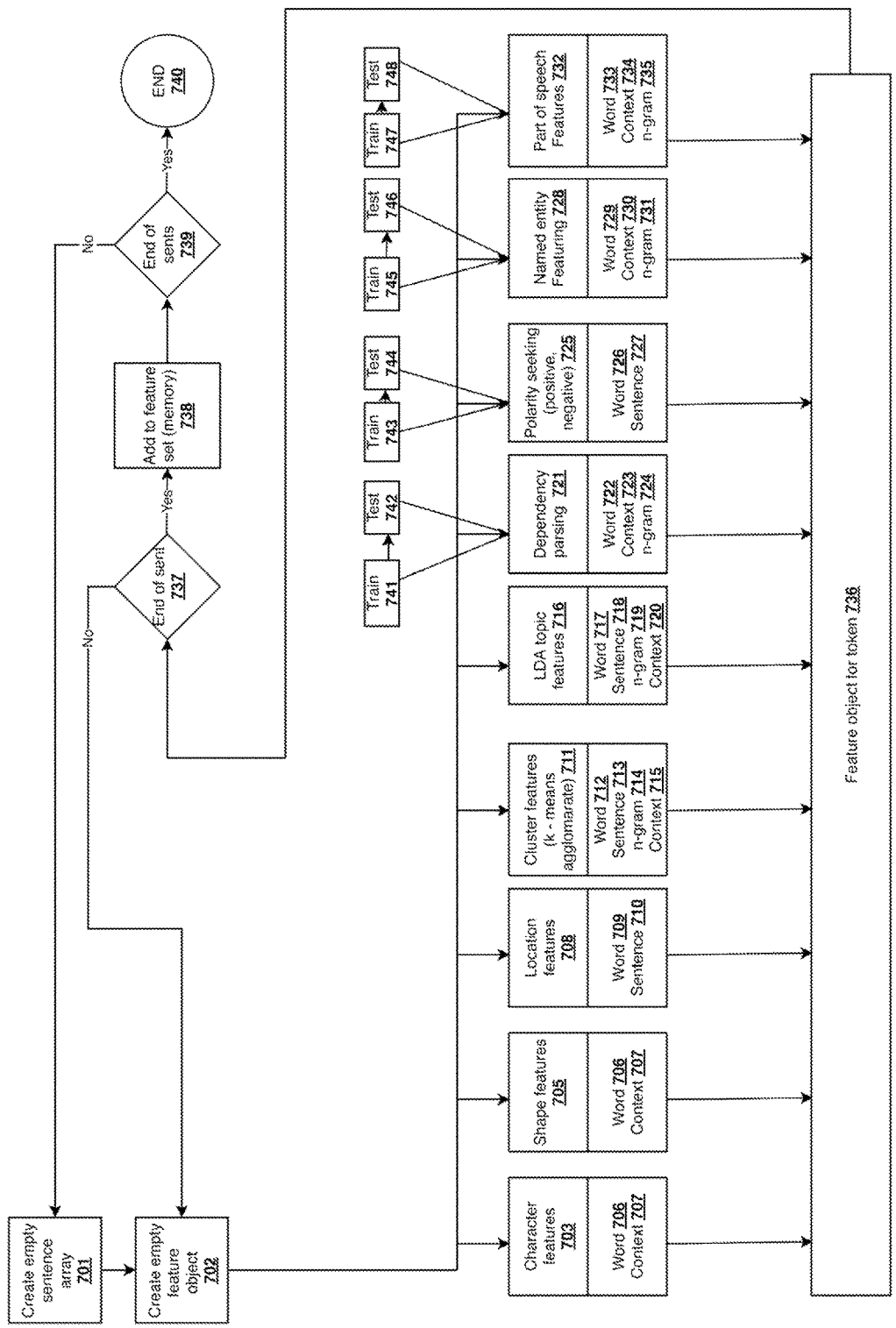
FIG. 7 is a flow diagram illustrating a method for identifying features within an electronic document, according to a preferred embodiment of the invention.

These features sets may be generated iteratively, by feature generator 504, for each token within the sentence (referring to FIG. 7).

In a next step 611, supervised pre-trained expression tagging models are used for the structured prediction of expression varieties in an electronic document (for example, an email). In a preferred embodiment, model creator 505 uses a conditional random fields (CRF) model to perform tagging, learning contextual sequential relationships and patterns, whereby the properties of the context, both prior and subsequent are leveraged through the feature paradigms outlined. Advantageously, in a preferred embodiment, CRF performed by model creator 505, is exceptionally well suited to learning underlying linguistic/syntactic relationships between custom defined expression categories of the schema disclosed herein. Accordingly, CRF models, by model creator 505, generate sequences of labels for sequences of input features.

FIG. 7 is a flow diagram illustrating a method for identifying custom expression varieties within an electronic document, according to a preferred embodiment of the invention. According to the embodiment, the method described herein will analyze an electronic document to identify a plurality of features for each token of a sentence comprised within the electronic document. In a first step 701, an empty sentence array is created by feature generator 504 for analysis of a first sentence of one or more sentences associated with the electronic document. In a next step 702, an empty feature object is created by feature generator 504 to store a plurality of features associated with a first token of a plurality of tokens as previously tokenized (referring to FIG. 6).

In a next step 703, a plurality of character level features such as sub-word features are generated by feature generator 504 by analyzing prefixes and suffixes of various lengths for the tokens 704 associated with the sentence. The plurality of features, comprised within the feature object, enables model creator 505 to create a model such that expression predictor 509 is operable to learn a sub-word semantic structure associated with a particular language to extract a custom rubric of expression. It can be appreciated by one with ordinary skill in the art that such a structure may be useful source of information given a challenging token sequence prediction task, by expression predictor 509, as described herein.

In a next step 705, shape features may be generated, by feature generator 504, to provide explicit information into the casing, length and type of characters which comprise the token (word 706). It can be appreciated by one with ordinary skill in the art that generated shape features provide indicators to a nature of word 706. Accordingly, context 707 features may be based on word 706 and its surrounding words.

In a next step 708, location features may be generated, by feature generator 504, to provide information about a relative position of (a) word 709 within its encompassing sentence 710, (b) sentence 710 within its encompassing paragraph. Accordingly, these features enable model creator 505 to generate a model to represent interdependencies between tokens, words or sequences of words, their positions within a sentence, and how these might affect the likelihood of a word span belonging to a type of expression subsumed within the sentence. Similarly, the same may apply to a sentence position within a paragraph. For example, a greeting is very unlikely to be located within the middle of a paragraph.

In a next step 711, cluster features (k-means agglomeration) using semantic embedding models may be created, by feature generator 504, for the token (word 712) embeddings for individual words 712, and separately for document vectors for sentences 713. Further, including these as abstract features themselves, model creator 505 learns clustering models (k-means and agglomerative clusters), for word 712, sequence of words (n-gram 714), and sentence 713 vectors. Model creator 505 may learn a variety of clustering models, with different values of k (that is, number of clusters), to create clusters of different granularities to serve as rich semantic features that may aid the model as high-level semantic groups. This model may be trained, by model creator 505, by feeding a plurality of unlabeled sentence 713 and word 712 vectors to the modeling algorithm and allowing the algorithm to converge on optimal centroid positions. In some embodiment each cluster is represented by context 715.

In a next step 716, a Latent Dirichlet Allocation (LDA) may be used, by model creator 505, as a generative statistical model to discover a plurality of latent topics (context 720) within the corpus of training data. The plurality of topics may represent a source of rich semantic features, both as abstract vectors of coefficients, that is, a probability vector of a word 717, span of words (n-gram 719) and sentence 718 associating with a particular topic (context 720), and as explicit categories (taking a maximum value from the probability vector). In some embodiments a corpus of documents may be used to train, at least, cluster features 711 and LDA topic features 716 in an unsupervised manner.

In a next step 721, syntactic dependency parsing, by feature generator 504, generates informative features according to a relationship of word 722 to its root verb. Accordingly, this may provide contextual information 723 regarding a grammatical role of word 722, as a component of its surrounding clause (n-gram 724), assigning structure to the sentence in the form of a dependency tree.

In some embodiments, dependency parsing described above may be used, in training step 741, to ensure that model creator 505 creates a model such that expression predictor 509 is operable to recognize patterns in data. Cross-validation data may then be used to ensure better accuracy and efficiency of the algorithm used to train expression predictor 509. Accordingly, test data may be used, in testing step 742 to see how well expression predictor 509 can predict new latent topics based on its training.

In a next step 725, polarity seeking (that is, positive or negative), by feature generator 504, may generate word 726 and/or sentence 727 polarities to indicate an interpreted sentiment, impact, or effect, that word 726, a span of words, or sentence 727 may have on a user's interpretation of the sentence, for example: positive, negative, compound, neutral, or the like. In a preferred embodiment, natural language toolkit (NLTK)'s Vader™ may be used for sentiment analysis, but in other embodiments, a special purpose plurality of programming instructions may be implemented for sentiment analysis, by model creator 505, by labelling words 726, spans of words or sentences 727 with associated interpreted sentiment polarities and for training a series of regression models.

In some embodiments, sentiment training data described above may be used, in training step 743, to ensure that model creator 505 creates a model such that expression predictor 509 is operable to recognize sentiment patterns in an electronic document. Accordingly, cross-validation data may then be used to ensure better accuracy and efficiency of the algorithm used to train expression predictor 509. As such, test data may be used, in testing step 744 to determine how well expression predictor 509 may predict future sentiment based on its training.

In a next step 728, named entity features may be derived, by feature generator 504, by locating and classifying named entities comprised within word 729 and/or a series of words (n-gram 730) comprised within the electronic document. In a preferred embodiment, a spaCy™ library extractor may be used to find at least one or more of the following groups (referring to Table 2):

TABLE 2

| TYPE | DESCRIPTION |
|---|---|
| PERSON | People, including fictional. |
| NORP | Nationalities or religious or political groups. |
| FAC | Buildings, airports, highways, bridges, etc. |
| ORG | Companies, agencies, institutions, etc. |
| GPE | Countries, cities, states. |
| LOC | Non-GPE locations, mountain ranges, bodies of water. |
| PRODUCT | Objects, vehicles, foods, etc. (Not services.) |
| EVENT | Named hurricanes, battles, wars, sports events, etc. |
| WORK_OF_ART | Titles of books, songs, etc. |
| LAW | Named documents made into laws. |
| LANGUAGE | Any named language. |
| DATE | Absolute or relative dates or periods. |
| TIME | Times smaller than a day. |
| PERCENT | Percentage, including "%". |
| MONEY | Monetary values, including unit. |
| QUANTITY | Measurements, as of weight or distance. |
| ORDINAL | "first", "second", etc. |
| CARDINAL | Numerals that do not fall under another type. |

In a next step 730, context considers that a word prior or after the current token (that is surrounding words) may be one of the above entities (referring to Table 2), and such information may be valuable to determine the nature of the word semantically/syntactically within the sentence thereby facilitating an accurate classification.

In some embodiments, named entity features described above may be used, in training step 745, to ensure that model creator 505 creates a model such that expression predictor 509 is operable to recognize named entity patterns in the electronic document. Accordingly, cross-validation data may then be used to ensure better accuracy and efficiency of the algorithm used to train expression predictor 509. As such, test data may be used, in testing step 746 to determine how well expression predictor 509 can predict new named entity features based on its training.

In a next step 732, POS features may be generated, by feature generator 504, to categories of words 733, and/or sequences of words (n-gram sets 735) into their syntactic categories (context 734). In a preferred embodiment, a spaCy™ open source library may be used for this purpose, which, in some embodiments, may be regularly updated and retrained. In some embodiments, a native implementation may be used. The spaCy™ POS tagger may categorize words 733 into the following syntactic groups (referring to Table 3). These features may represent the syntactic class of a particular word:

TABLE 3

| POS | DESCRIPTION | EXAMPLES |
|---|---|---|
| ADJ | adjective | big, old, green, incomprehensible, first |
| ADP | adposition | in, to, during |
| ADV | adverb | very, tomorrow, down, where, there |
| AUX | auxiliary | is, has (done), will (do), should (do) |
| CONJ | conjunction | and, or, but |
| CCONJ | coordinating conjunction | and, or, but |
| DET | determiner | a, an, the |
| INTJ | interjection | psst, ouch, bravo, hello |
| NOUN | noun | girl, cat, tree, air, beauty |
| NUM | numeral | 1, 2017, one, seventy-seven, IV, MMXIV |
| PART | particle | 's, not, |
| PRON | pronoun | I, you, he, she, myself, themselves, somebody |
| PROPN | proper noun | Mary, John, London, NATO, HBO |
| PUNCT | punctuation | ., (, ), ? |
| SCONJ | subordinating conjunction | if, while, that |
| SYM | symbol | $, %, §, ©, +, −, ×, ÷, =, :), 😀 |
| VERB | verb | run, runs, running, eat, ate, eating |
| X | other | sfpksdpsxmsa |
| SPACE | space | |

In some embodiments, POS features described above may be used, in training step 747, to ensure that model creator 505 creates a model such that expression predictor 509 is operable to recognize POS patterns in the electronic document. Accordingly, cross-validation data may then be used to ensure better accuracy and efficiency of the algorithm used to train expression predictor 509. As such, test data may be used, in testing step 748 to determine how well expression predictor 509 can predict new POS features based on its training.

In a next step 736, a feature object for the instant token is created by feature generator 504. In a next step 737, if the end of the sentence has been reached, the feature object is saved to feature database 520. Otherwise, referring again to step 737, if the end of the sentence has not been reached the method returns to step 702 whereby a new feature objects is created for the next token in the sentence, and processing continues as described above.

In a next step 739, if the end of all available sentences has been reached (that is, the end of the document), the process ends at step 740. referring again to step 739, if the end of all available sentences has not been reached, the method returns to step 701 where a new sentence array is created for the next sentence, and processing continues as described above.

Figure 8:
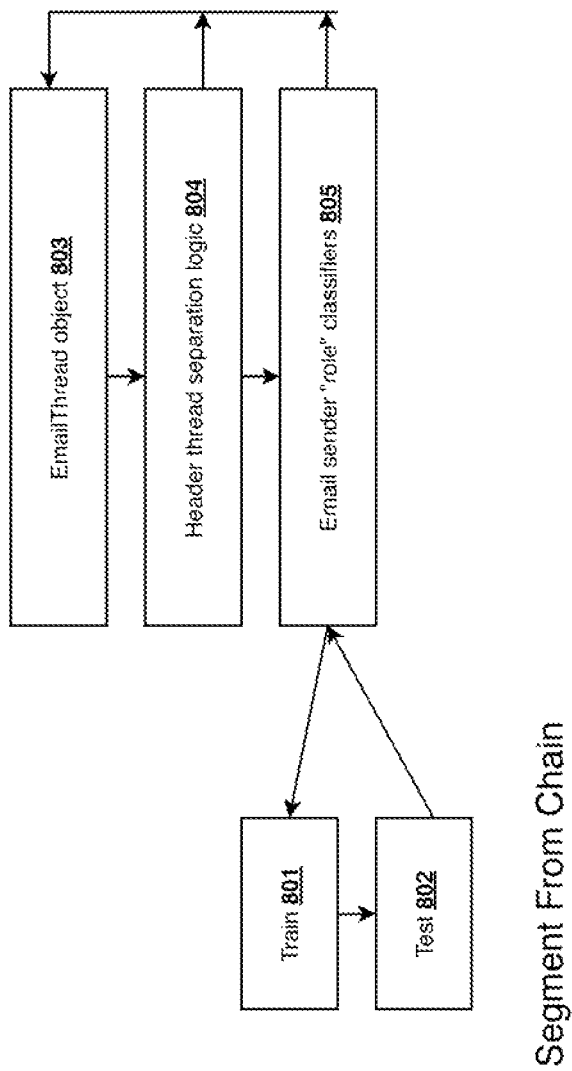
FIG. 8 is a flow diagram illustrating a method for segmenting an electronic document and assigning relative roles to the parties involved in each segment, according to a preferred embodiment of the invention.

FIG. 8 is a flow diagram illustrating a method for segmenting an electronic document and assigning relative roles to the parties associated with each segment, according to a preferred embodiment of the invention. A dataset for the training of a role classification model may be curated by vectorizing segments and associating each with the respective sender class (for example, customer, vendor, solicitor, responder, etc.), either by hand or leveraging existing knowledge through an automated system. A model may then be trained at step 801, to predict the role of the email sender. According to the embodiment, prior to training a role classification model, data may be split into a training set at step 801, and a test set at step 802, which is withheld to enable generalized performance assessments to be conducted. In step 803, an EmailThread class object may be received from step 917 (referring to FIG. 9). In a next step, leveraging the location of identified headers, the email thread is segmented into individual communication, of a chain of communications, (in a preferred embodiment, individual emails of a chain of emails). Once the EmailThread object has been separated into constituent segments, a classification for an actor role is predicted, by role predictor 512, for each email In a marketing or sales email outreach embodiment, an actor role associated to an email constituent may be, for example, a seller, prospect, or the like. In a next step 805, a document classifier architecture may be sufficient for the task of role, or actor, allocation, as the type of language used in an outreach email vs language used in a response email will be distinct, and each should have some homogeneity. For example, word embedding models known in the art may be used to generate semantic document vectors for each email, and use labeled examples of documents with assigned role classes to train, by model creator 505, a vanilla neural network.

Advantageously, for automated analysis frameworks, or sequence generation models like the disclosed invention, whereby a combination of expressions and language used by the seller in an email outreach, expressions and language may be evaluated for effectiveness by characterizing a nature associated with responses to seller approaches. In some embodiments, this analysis may be conducted relative to a seller profile (for example, a profile previously stored in user database 521) whereby a user-customized, or optimized, approach may be determined, by systems and methods disclosed herein, to determine, or learn, which types of approach (that is, the language and expressions within outreach emails) may be more effective.

Figure 9:
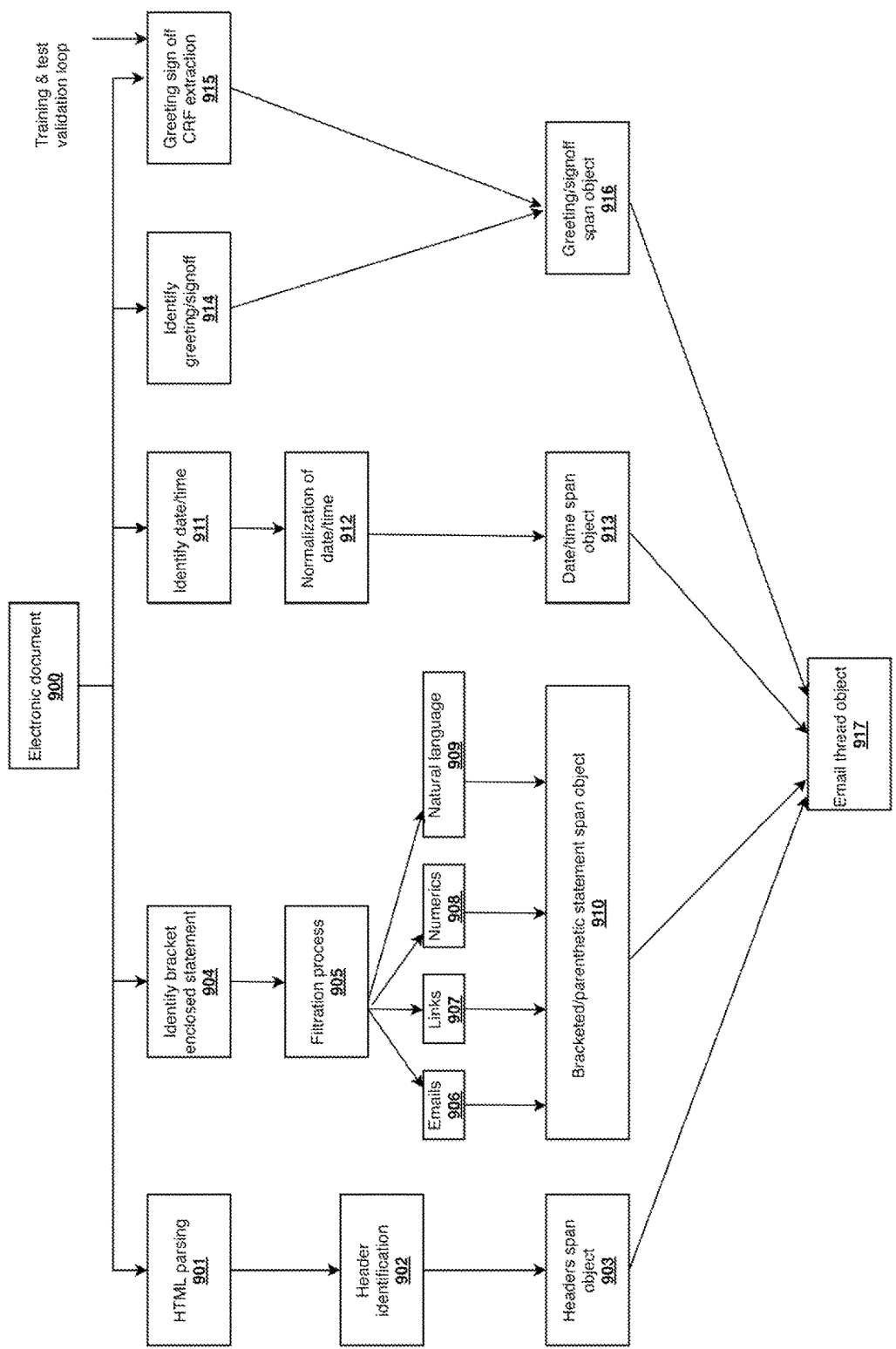
FIG. 9 is a flow diagram illustrating a method for extracting metadata from an electronic document, according to a preferred embodiment of the invention.

FIG. 9 is a flow diagram illustrating a method for extracting metadata from an electronic document, according to a preferred embodiment of the invention. According to the embodiment, in a first step 900 an electronic document (for example, an email) is identified for extraction of metadata. In a series of next steps 901, 904, 911, 914, and 915, whereby the series on next steps may, in some embodiments, happen simultaneously, the electronic document is processed. Particularly, in step 901, html parser 506 may clean an email of associated HTML tags by converting HTML strings into plain text. In a next step 902, header identifier 507 may use a plurality of predefined sequences of characters to define search patterns as a find operation to identify email headers. In a next step 903, the header spans may be placed in a header object to hold them in memory.

Referring now to step 904, bracket identifier identifies text enclosed in parentheses or square brackets. In a next step filtration subprocess 905 begins comprising steps 906, 907, 908, and 909. particularly, in step 906, email addresses are filtered, in step 907 hyperlinks are filtered, in step 908, numeric content is filtered, and in step 909, natural language is filtered. It should be appreciated that step comprising steps 906, 907, 908, and 909 may be executed, by filter unit 508 simultaneously. In a next step 910 a bracketed/parenthetic statement object is created to hold the different collections of filtered elements in memory.

Referring now to step 911, parser 506 identifies data and time information comprised within the electronic document. In a next step 912, date and time fields may be normalized. In a next step 913, a date-time span object may be created comprising date time information comprised within the electronic document.

Referring now to step 914, a greeting and signoff may be extracted, by greeting/signoff extractor 510, from the electronic document. It can be appreciated by one with ordinary skill in the art that an electronic document such as an email may comprise a greeting and a signoff, and these may be useful for actor identification and cleaning components.

Referring now to step 915, a greeting and a signoff may be extracted. In a preferred embodiment, metadata detection methods are performed by custom build heuristics or using CRF models, or both, for detection of greeting and sign off. In a next step 916, a greeting/signoff span object is created.

Upon completion of at least a portion of steps 903, 910, 913, and 916, in a next step 917, an email thread object comprising at least a portion of a combined header span object, bracketed/parenthetic span object, date/time span object, and a greeting/signoff object, may be created.

Figure 10:
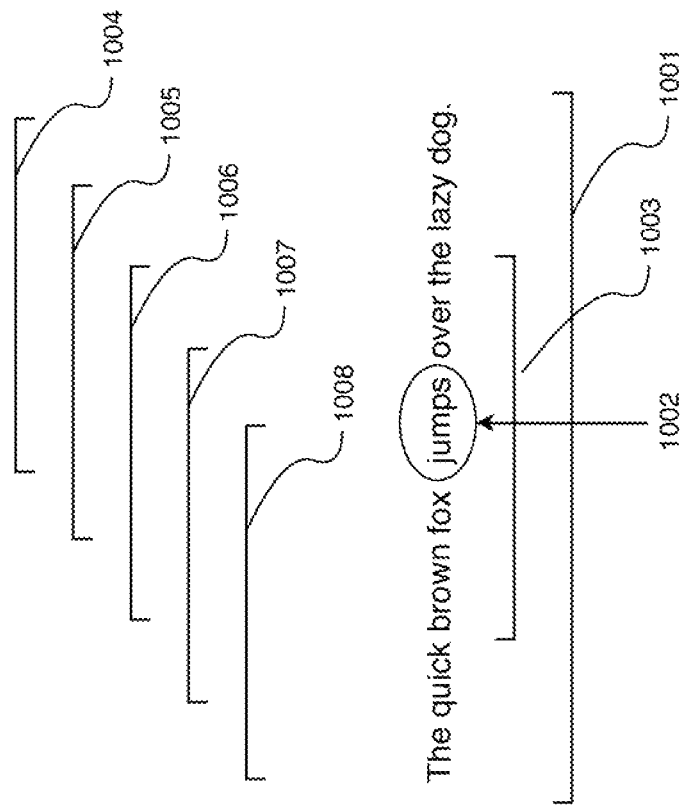
FIG. 10 is a diagram illustrating an exemplary identification of features for a word comprised within a sentence, sentence, context and n-gram comprised within an electronic document, according to a preferred embodiment of the invention.

FIG. 10 is a diagram illustrating an exemplary identification of features for a word comprised within a sentence of an electronic document, according to a preferred embodiment of the invention. According to the embodiment, word features may relate to individual token 1002 within sentence 1001. For example, where a token 1002 is "jumps" is the current token being analyzed, by feature generator 504, at least one feature will be determined, for example, for a POS, "jumps" would be associated to a verb (referring to Table 3). Accordingly, a set of features for a word may be generated by the systems and methods disclosed herein (referring to FIG. 7). In some embodiments, a context level may be selected, for example, a context=2 whereby the token is analyzed in light of surrounding tokens 1003, for example, "brown fox jumps over the" whereby 2 tokens on either side of current token 1002 are considered by feature generator 504.

A sentence feature may relate to the entire sentence 1001. For example, feature generator 504 may generate a feature set for a sentiment polarity for the at least a portion of sentence 1001. Accordingly, by analyzing token 1002, the word may generate a neutral sentiment polarity (that is, it does not invoke positive or negatives sentiment); however, when analyzing the sentence as a whole, the sentence may have a slight positive sentiment.

An exemplary identification of features for n-grams 1004, 1005, 1006, 1007, and 1008 comprised within sentence 1001 may comprise n-gram features as a sequence of features. Accordingly, feature generator 504 not only considers one contextual word 1002 in isolation, but also, for example, a sequence of words, or word span, for n-gram 1008 (that is, "the quick brown fox jumps"), n-gram 1007 (that is, "quick brown fox jumps over"), n-gram 1006 (that is, "brown fox jumps over the"), n-gram 1005 (that is, "fox jumps over the lazy"), and n-gram 1004 (that is, "jumps over the lazy dog"). It should be appreciated that the above n-gram features may be of variable length and not encompass the full context.

In an exemplary embodiment whereby POS features are being computed, by feature generator 504, a sequential array, and an associated feature value may be generated. For example, considering sentence 1001 as a span, POS features may be assigned as follows: the DET; quick ADJ; brown ADJ; fox NOUN; jumped VERB; over ADP; the DET; lazy ADJ; dog NOUN; .PUNCT (referring to associated POS features in Table 3).

Figure 11:
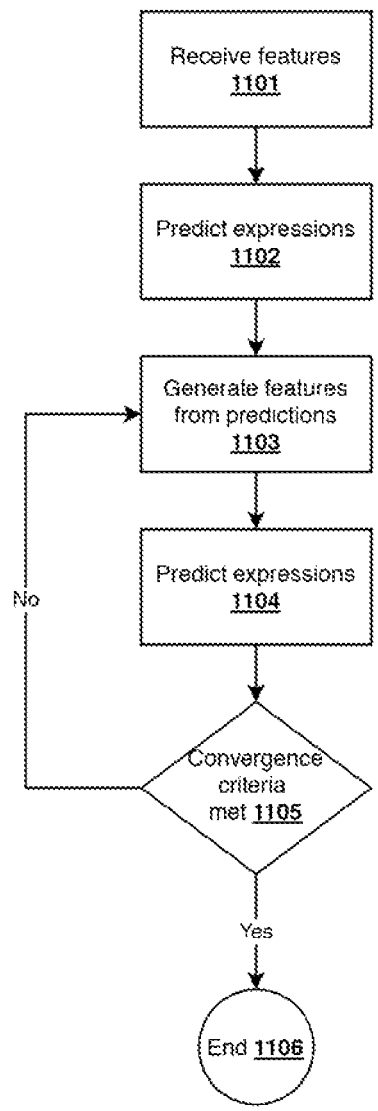
FIG. 11 is a flow diagram showing an exemplary method for iterative prediction for presence and location of expression varieties, according to a preferred embodiment of the invention.

FIG. 11 is a flow diagram showing an exemplary method for iterative prediction for presence and location within an electronic document, of expression varieties, according to a preferred embodiment of the invention. According to the embodiment, a plurality of models may be trained independently (referring to FIG. 12) whereby an iteration to convergence may be desired. Advantageously, in some embodiment this allows each conditional random field (CRF) model to learn from the knowledge of the other independently trained models, using the predictions of the other independently-trained models as augmented information-rich features, that may yield information associated with relationships between expression varieties.

In a first step 1101, upon all sentences having been processed, a plurality of feature object arrays is received from step 740 (referring to FIG. 7). These feature sets may not include any features that relate to tags.

In a next step 1102, a first feature object array may be passed to a set of models (one model for each expression variety) to make predictions, by expression predictor 509, regarding the presence of different expression varieties across a plurality word spans (herein also referred to as token spans) comprised within the electronic document. It should be appreciated by one with ordinary skill in the art that subtle differences in token spans versus word spans in that a token span may occasionally cross a boundary of a word (for example, when considering a hyphenated word); however, for some embodiments, systems and methods disclosed herein may use the terms "word spans" and "token spans" interchangeably). A first set of models may have been trained, by model creator 505, using labelled data, with each model trained independently, i.e. tags of the other expression varieties are not included when training these models (referring to FIG. 12).

In a next step 1103, predictions, by expression predictor 509, of other varieties into a set of feature objects may be augmented.

Figure 12:
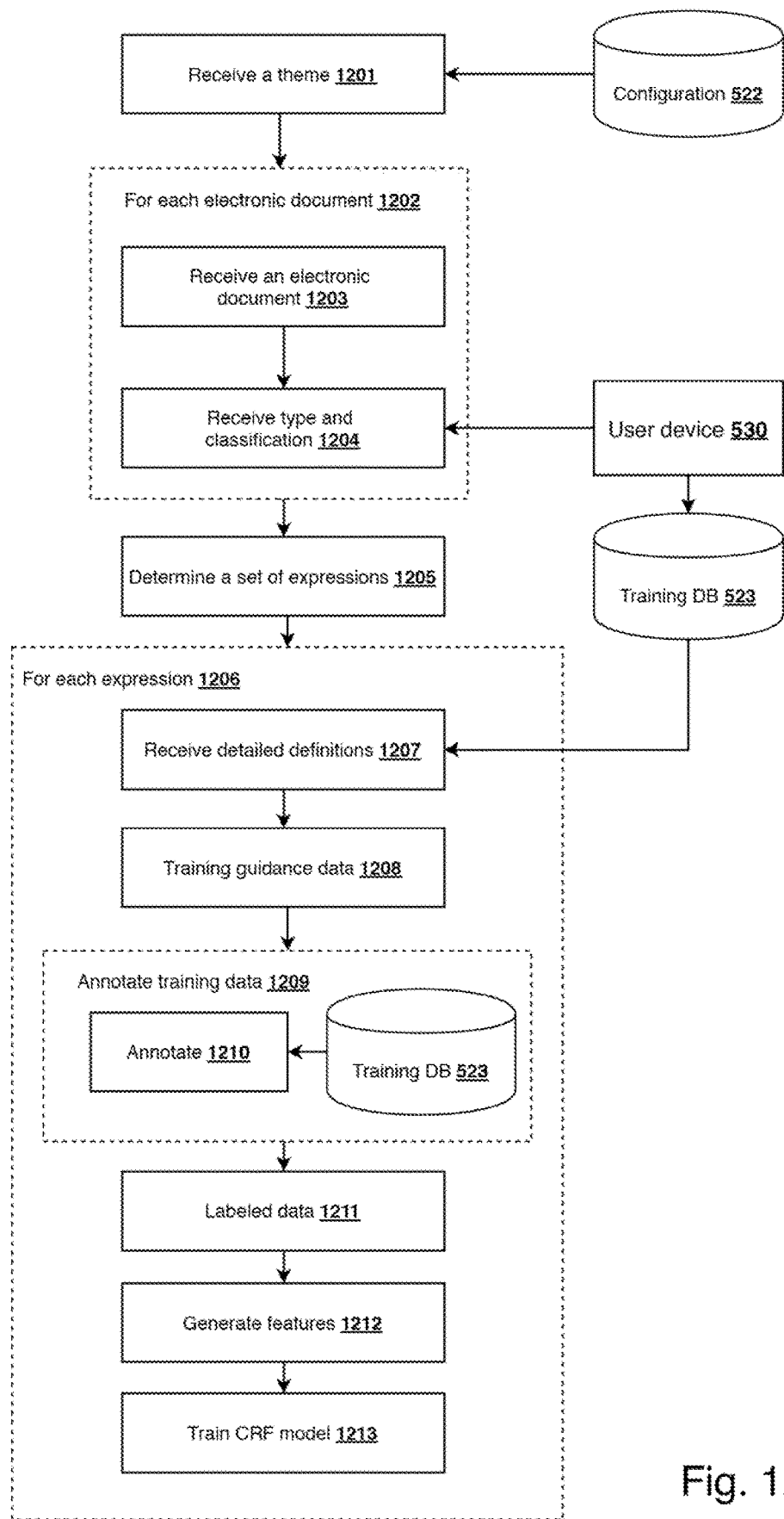
FIG. 12 is a flow diagram illustrating an exemplary method for training a plurality of independent CRF models based on a plurality of expression varieties, according to a preferred embodiment of the invention.

In a next step 1104, expression predictor 509 may consider predictions of models for other expression varieties (as resultant from CRF modeling depicted in FIG. 12). In training, a second set of models may be given correct labels of the other expression varieties, so that it can learn interdependencies between the different expressions, and how the presence or absence of each label, in a given location of the electronic document, may affect the probability of a word, or span of words, falling under the a pre-determined target expression variety, wherein the target expression variety represents a specific theme for the document. A theme may be a general categorization for a set of desired categories of expression varieties and represent a style of interaction, for example within an electronic document, whereby commonalities in terms of linguistics are present with, in some embodiments, formality about how the interactions may be conducted (for example, a plurality of documents, or emails, that follow a topic, such as a sales oriented interactions, recruitment themed interactions, customer service oriented interaction, or other types of interactions). Advantageously, the models may share learned knowledge between different expression models. Various feature patterns may be important for different expression varieties by sharing predictions of the other expression models, thereby enabling systems and methods disclosed herein to be operable to predict based on cumulative and independently learned information.

In a next step 1105, once a second set of predictions is computed, by expression predictor 509, if a pre-configured convergence criteria is not met, the method returns to step 1103. Convergence criteria may include pre-configured criteria such as "no predictions changed in the instant iteration", "less than a pre-defined number of predictions changed in the instant iteration", or the like, and may provide an indication when a convergence criteria is met. It should be appreciated that convergence criteria may be based on a pre-defined measure of change between prediction iterations (that is, steps 1103-1105) or some other criteria received in parallel or simultaneously while method 1100 is executed by the processor.

In a next step 1106, the method may terminate with final predictions of expression varieties are determined with respective locations, of the expression varieties, within the electronic document.

FIG. 12 is a flow diagram illustrating an exemplary method for training a plurality of independent CRF models based on a plurality of expression varieties, according to a preferred embodiment of the invention. According to the embodiment, in a first step 1201, a first theme of a plurality of themes is received, at model creator 505, from configuration database 522. In some embodiments a theme is received from user device 530 or an input device communicably connected to model creator 505. In some embodiment, a theme is associated to an objective (as described herein) whereby a theme may describe a style of writing (for example, sales oriented communications may be associated to a theme, whereas an outcome of the sales oriented discussion may be associated to an outcome of the discussion such as a sale or rejection of a proposal). In a next plurality of steps 1202, a plurality of electronic training documents is received for classification. Specifically, in step 1203, a first document may be received, at model creator 505, in a next step 1204, for classification of expressions by receiving a type and classification, by model creator 505, from one or more user devices 530. Additionally, a detailed definition may be received by the one or more user devices 530 associated with the type and classification and, in some embodiments, stored in training database 523. The process continues for a pre-specified quantity of electronic training documents or for some other preconfigured measure. In a next step 1205, a set of expression varieties may result from the plurality of steps 1202. In a next plurality of steps 1206, model creator 505, may train a model for each expression variety. Specifically, in step 1207, the detailed definition associated with a first expression variety may be received (for example, from user device 530 or training database 523, and/or another location) and be combined with a type and category. In a next step 1208, the type, category, and detailed definitions may be received from step 1207, and provided to a plurality of steps 1209 for annotation. Specifically, in step 1210 an annotation engine (for example, Stanford BRAT™, Prodigy™, UBIAI Web Services™, and the like), or a custom built annotation engine eliciting, transcribing, and analyzing language samples, may be used by providing a large quantity (for example, thousand, tens of thousands, millions, or more) of electronic training documents (for example, from training database 523) for analysis (for example, using a word-by-word and phrase-by-phrase analysis) to determine a tag for each span of words, of a plurality of spans of words, to determine which span of words may fall under one of the categories of expressions previously determined (referring to step 1205). In a next step 1211, once each span of words has been labeled, a plurality of features are generated, in step 1212, for the expression variety, each token and/or span of tokens is associated with an indicator designating whether the token and/or span of tokens belongs to the class of expression (for example, positive) or not belonging to the class of expression (for example, negative). In a next step 1213, a trained CRF model is generated for the expression variety.

Advantageously, the plurality of steps 1206 results in a generation of a plurality of independent trained CRF models that are trained individually for each expression variety whereby each CRF model is unrelated to previously created CRF models, that is, without knowledge of labels for other types of expression varieties.

Advantageously, by augmenting feature sets that the instant models use to predict the presence or absence of a phrase, with labels (or predicted labels) of the other expression varieties, model creator 505 may, using systems and methods described herein, intuitively share knowledge of what each model has learned independently. Accordingly, by building additional sets of models, which may be trained with labels of other "parallel" label varieties for the surrounding context as features, interdependencies between expressions varieties may be gleaned to better learn the particular data patterns and/or sequences that are likely to indicate that a span of words either does or does not belong to the instant expression variety, supplementing implicitly the conditional probabilities of particular sequences or co-occurrences of multiple expression varieties.

Figure 13:
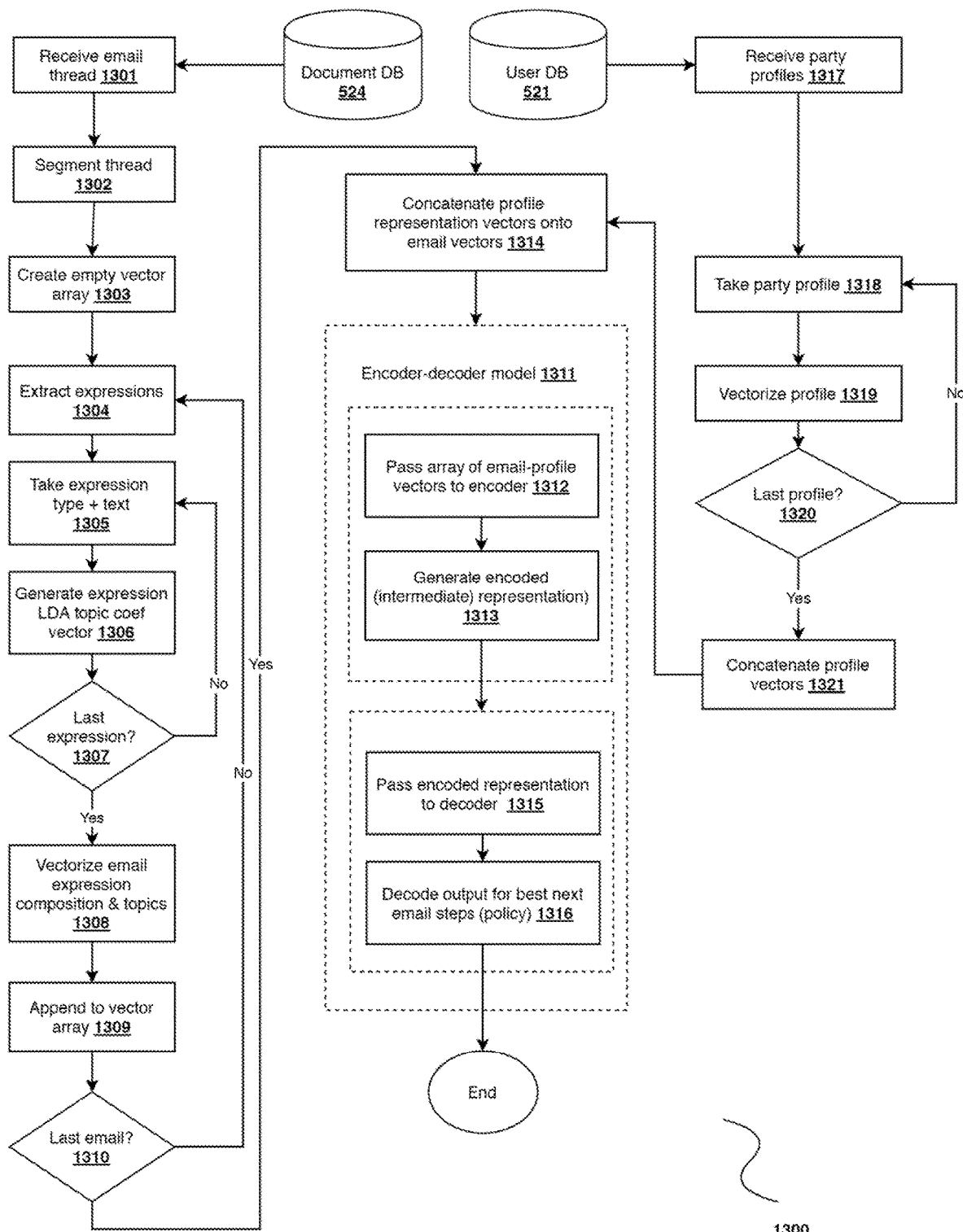
FIG. 13 is a flow diagram illustrating high-level method for a machine learning system for generating best correspondence policies from a sequence of communications represented in an electronic document, according to a preferred embodiment of the invention.

FIG. 13 is a flow diagram illustrating high-level method for a machine learning system for generating best correspondence policies from a sequence of communications represented in an electronic document, according to a preferred embodiment of the invention. According to the embodiment, a method is disclosed for generating best policies at a given time step of an interaction, as a fit over historical interactions with the sender/recipient (or recipients determined to have semantically similar profiles, to avoid a "cold start" problem, as is known in the art) optimizing a probability of achieving a pre-defined objective. An objective may be a quantified goal or a result to be sought after. Email (correspondence) threads may be parsed, splitting constituent segments, or communications (emails), and associating each individual segment with a relative role of its sender. Each constituent segment may be characterized by deconstructing the segment as a composition of custom expression varieties, pre-defined to the enable the fulfilment of the objective within the theme associated with an electronic document comprised of correspondence between a plurality of users. A semantic topic model is learned over the data for each expression variety, and semantic topics (or topic vectors) are generated for each identified expression. The expression compositions and associated topics are vectorized for emails up to the current item, to yield a time series of content vectors. An encoder-decoder architecture is trained to recommend the best policy for the next correspondence time step, that is, the next correspondence in a sequence of communications within an electronic document. This model may be fit to optimize for the specified objective by training the model on a dataset which is curated using sampling weighted by the score/class of success in the objective (for example, if outcome A is has a score of 0.2 and outcome B has 0.8, the training set will include 20% as many examples interactions that end in outcome A as are present for B). In a preferred embodiment, a final output may be a set of ranked best policies comprising a suggested best next email template, with structure in sequential expression varieties and a best choice semantic topic (and corresponding vocabulary) for each expression.

Accordingly, in a first step 1301, a data structure, or raw string containing a thread of electronic communications (for example, an email or a plurality of emails) is received from document database 524. In a next step 1302, The thread is sliced into constituent parts and segmented into segments, the segmentation leveraging, for example, email headers (referring to FIG. 6: at least, step 604). For example, in a preferred embodiment where the electronic document is an email, individual parts of the email may be divided/segmented into parts by, for example, sender/recipient communications. In a next step 1303, a data structure is created to hold a sequence of vectors in memory. In a next step 1304, expressions are extracted as described previously (referring to at least FIG. 6: at last steps 605-611), for a first constituent part thereby enabling a characterization of a structure and content associated with the segment as a composition of expressions. In a next step 1305, expression type and associated text are fed as a span of words and their category into semantic modelling (described in the steps below).

In a next step 1306, expression LDA topic coefficients are generated. Specifically, an LDA topic model is trained for each type of expression variety. An extraction of large dataset of expressions is performed by passing expression models (described herein) over document database 524. Text spans are identified and separated for each expression variety to create large sets of examples for each variety of expression. An unsupervised LDA topic model may then be trained to learn latent semantic topics associated with that expression type. Accordingly, when an expression and its corresponding type is received (for example. "we've just purchased a new coffee machine": "REASON"), a relevant topic model is called to find a vector of topic coefficients (that is, the "strength" of a span of words' association with each of the discovered topics). In some embodiments, only the most strongly associated topic may be considered, and an associated label used to represent the semantics, however, in a preferred embodiment, a vector of coefficients provides richer information. One skilled in the art may appreciate that any choice of appropriate semantic modelling might be chosen in place of LDA, but that LDA's decomposition of the semantic space as a mixture of latent topics, and its association of each word to the topics with varying degrees of strength, make it an advantageous choice for generating intuitive suggestions for choice of language. In a preferred embodiment, a pair is created, of a plurality of pairs, comprising an expression type associated to the expression and a semantic vector associated to the expression.

Accordingly, a result may be a composition of expression varieties and a vector to represent semantics of the language used for each expression. Learning a topic model for each expression variety allows granular topics centred on a very specific language domain.

In a next step 1307, LDA topic coefficient vectors are generated for each expression, until there are none remaining. That is, if there are more expressions, to process, step 1307 returns to step 1305 to process the next expression. Once at least a portion of all expressions have been processed, in a next step 1308, a feature vector for each segment of the electronic document is created to mathematically represent the composition of expressions and corresponding semantics for each segment. In a next step 1309 the vector is added to a thread array. In a next step 1310, if more document segments remain, the process returns to step 1304 for the next segment vector is added until all emails have been vectorised and added to the data structure. A sequence of email characterisation vectors is the result. In some embodiments, the plurality of pairs are combined into a segment vector for the segment, of a plurality of segment vectors wherein to combine the plurality of pairs, a structure of the segment as a decomposition of its constituent expressions with semantic information for the respective expression is encoded.

In a preferred embodiment, a parallel process simultaneously processes a plurality of user profiles. In a first step 1317, a plurality of user profiles is received from user database 521. One or more policies that is optimal for a first profile, of the plurality of profiles, of sender/recipient pair is sought rather than finding policies that work generically across the universe of seen examples. Accordingly, the policy generation model for suggesting next best correspondences learns from profile related features. In the first step we receive the profiles of the sender recipient from user database 521. Profiles may include HR profiles (such as CVs), for example received from external services 540, however any useful set of attributes relating to the persons characteristics or behaviour may be used. In a preferred embodiment, one or more profiles of senders and recipients are vectorized to encode characteristics associated with the plurality of document segments into a profiles vector, wherein the senders and recipients are each associated with at least one segment of the plurality of segments.

In a next step 1318, one of a number of semantic embedding techniques (for example, fastText™, doc2vec™, and the like) may be used to represent language-based features of an individual as a kind of dense vector. In a preferred embodiment embedding text fields via one-hot encoding, may be used for categorical features, and then be combined with semantically embedded fields to generate a representation over a profile. In some embodiments, a tuning task is used with a deep learning architecture to weight the information and learn interdependencies across the profile features in a joint representation, by taking an internal representation from the network, as is common in semantic embedding literature. In other embodiments, different methods for vectorizing profiles may be used. In a next step 1320, processing returns to process all user profiles. Once at least a portion of all profiles have been vectorized, in a next step 1321, the vector for the sender and the recipient are joined. In cases with multiple senders/recipients are identified, a centroid (average coordinate) may be found to represent a superposition of the individuals in each role.

In step 1314, for each vector in the array of segment vectors a profile vector is appended.

In a plurality of steps 1311, in a preferred embodiment, the pre-trained encoder-decoder architecture may be applied, by neural sequence generator 511, to recommend the best policy for a next correspondence time step, that is for the next step of the sequence in the communication sequence. In a next step 1312, the array of vectors may be passed to an encoder architecture comprised of multiple layers of RNN units, (typically LSTM or GRU). The array of vectors represents a time series of vectors, with one document segment at each time step. The model architecture learns to form a representation, at step 1313, and hidden state at each time step, and passes this forward through the network layers. At the end of the encoder half of the model may be an output of a single context vector which may be a generated dense latent representation of the series of emails. In a next step 1315, a decoder architecture comprises multiple layers of RNN units may capture maximal probabilities for the first time-step, i.e. the next document segment. The output vector(s) may be decoded, by Neural sequence generator 512, in step 1316, into a suggestion for the next correspondence segment(s) vectors. These vectors may be reverse transformed into an expression structure and recommendations for suggested semantic topic/vocabulary with each expression in the structure. In a preferred embodiment, the one or more suggestions comprise a structure, one or more expressions, and a plurality of text associated to the corresponding semantic vectors, i.e. a template for the correspondence, further wherein each suggestion of the one or more suggestions correspond to a different segment. It should be appreciated by one having ordinary skill in the art that other sequence generation models may be equivalently applied.

Figure 14:
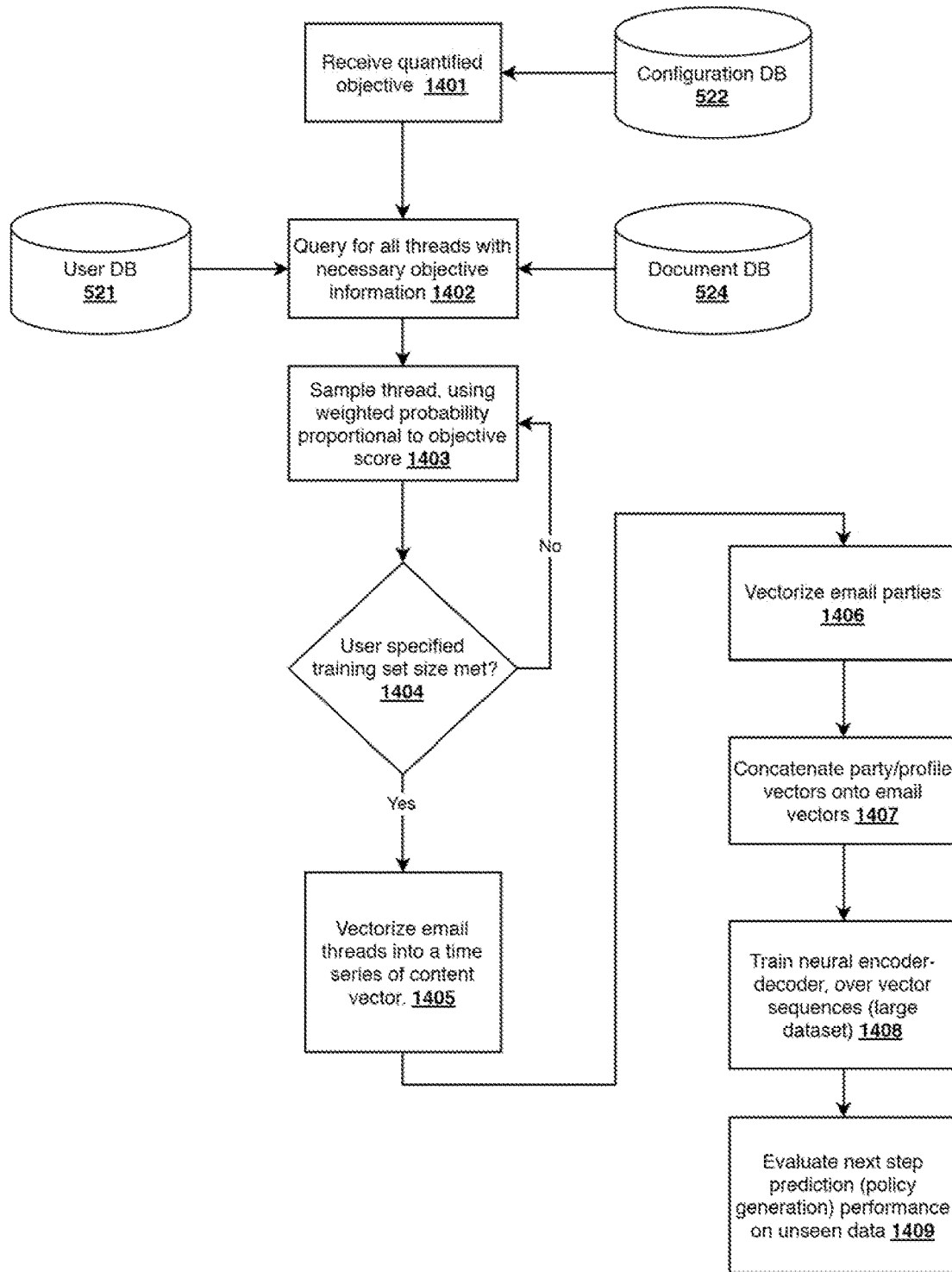
FIG. 14 is a flow diagram illustrating a method for processing electronic documents to predicting a next correspondence, according to a preferred embodiment of the invention.

FIG. 14 is a flow diagram illustrating a method for training a model for processing electronic documents to generate policy suggestions for a best next segment(s) of correspondence, according to a preferred embodiment of the invention. According to the invention, in a first step 1401, a quantified objective may be received from configuration database 522 (or in some embodiments, from user device 530) for use in optimizing a policy generator model. Accordingly, the objective may be measurable and numerically expressed. For example, client sales, interaction feedback scores, social media likes, customer churning, other quantifiable characteristics, and the like.

In a next step 1402, a query for all threads with necessary objective information is performed by model creator 505 that receives the electronic document comprising correspondence that may have data points associated with an objective, from document database 524, of a plurality of communication interactions (for example comprised within the plurality of electronic document). It should be appreciated that the plurality of electronic documents, in some embodiments, may number in the millions of documents. In some embodiment document database 524 may be an electronic communication platform such as an email server, instant messaging server, archived communication database, or the like.

In a next step 1403, a dataset may be curated, by model creator 505, using a plurality of sample threads, using weighted probability according to an objective score that may be skewed towards the fulfilment of the objective using weighted sampling, whereby an objective score may be a binary value, a scale, a predefined set of values, or the like. In a preferred embodiment, random numbers may be drawn to select a sample whereby a probability of a particular sample may be proportional to the score in the objective. For example, if an objective score is configured to be a binary objective of sold versus business lost, and gave a sale a score of one, and a non-sale a score of zero, the entire training data may comprise segments of correspondence that, for example, ended with a positive result, (i.e. a sale). In another embodiment, if an electronic document comprised of a plurality of threads (segments) of a plurality of Reddit™ communications, based on the number of +1 scores, a final post may have threads whereby a final post having a +10 score may be five times as likely to be selected by the random method as communications comprising +2 scores, though class imbalances must be accounted for. By curating a training set in this manner, over a large enough universe of data, the model maximizes a likelihood of the objective being met (maximum likelihood of a sale, maximum likelihood of a large number of likes, or the like).

In a next step 1404, the random sampling of profiles may continue until at least a portion of all available profiles are processed in step 1403, for example, until a pre-defined size of training set results, such as hundreds of thousands of communication threads. In a next step 1405, communication chains, or segments, from the electronic document are vectorized into a time series of segment vectors. That is, generating expressions, and associated semantic topics for each document segment as described in FIG. 13 in steps 1301 to 1310. In a next step 1406, user profiles associated to the electronic document are vectorized ins a similar fashion as described previously. That is, generating expressions, and associated semantic topics for each document segment as described in FIG. 13 in steps 1317 to 1321.

In a next step 1407, for each segment in a segment sequence comprised within an electronic document, concatenation of profile vectors may be performed, by model creator 505, onto the segment vector. Accordingly, this provides a context that may allow the resultant model to learn how a segment, within which the sender/recipient are associated, affects a best policy for the fulfilment of the objective. That is, the model is provided with an information context required to suggest a suitable next segment of correspondence (or content for an email), associated with the particular recipient, for this particular sender, given the prior sequence of segments within the electronic document representing exchanged communication (between sender and recipient) over a time span. In a next step 1408, a neural sequence generation architecture, in the preferred embodiment the encoder decoder model described in FIG. 13 in steps 1311, by neural sequence generator 511, may be trained using techniques known in the art, such as, using a gradient descent optimization algorithm, minimizing prediction loss (maximizing objective probability), backpropagating to update weights over batches/epochs.

In a next step 1409, at least a portion data is preserved to not show the model during training, and measure performance by finding how well the model predicts the email vector (expression structure/semantics) whereby experimentation may be used to find an optimal configuration of hyperparameters, model size, regularization and the like. Said differently, once the one or more profiles of senders and recipients are vectorized to encode characteristics associated with the plurality of segments into a profiles vector, wherein the senders and recipients are each associated with at least one segment of the plurality of segments, the profiles vector are concatenated onto each segment vector of the plurality of segment vectors whereby the plurality of segment vectors may be sequentially fed into, for example, a neural sequence2sequence model to generate one or more next segment vectors, the neural sequence2sequence model previously trained to optimize the objective. In a preferred embodiment, the neural sequence2sequence model is trained over a large training set of previously weighted vectorized training documents wherein a probability of a first training document being selected for the training set is proportional to an associated score, the score associated to the objective, the large training set comprised of a sequence of email-profile vectors, whereby each email-profile vector encodes an associated email structure in terms of expressions and semantic vectors for each expression comprised within the email structure whereby a profile part of the email-profile vector encodes information associated to a sender or recipient and a prediction target comprises at least a portion of the sequence of email-profile vectors. In a preferred embodiment, the neural sequence2sequence model may use an encoder-decoder architecture (as described previously) comprising an encoder and a decoder wherein multiple layers of RNN units are in the encoder and the decoder.

The skilled person will be aware of a range of possible modifications of the various embodiments described above. Accordingly, the present invention is defined by the claims and their equivalents.

What is claimed is:

1. A system, comprising:
   a processor; and
   a memory comprising instructions that when executed by the processor, cause the processor to:
      segment an electronic document to identify a body of the electronic document;
      separate the body of the electronic document into sentences;
      tokenize the sentences, and generate features for constituent tokens of the sentences;
      generate labels for the features in accordance with an iterative application of a plurality of machine learning models, labeled features being used for training an expression prediction model; and
      identify and locate expression varieties in subsequently received electronic documents using the expression prediction model.

2. The system of claim 1, wherein the memory comprises further instructions that when executed cause the processor to extract metadata from the electronic document, and store the metadata in a new or existing metadata object.

3. The system of claim 2, wherein the instructions that when executed cause the processor to segment the electronic document, comprise further instructions that when executed cause the processor to identify greetings and signoff of the electronic document based on the extracted metadata.

4. The system of claim 3, wherein the instructions that when executed cause the processor to segment the electronic document, comprise further instructions that when executed cause the processor to isolate text between the greetings and the signoff from the body of the electronic document.

5. The system of claim 4, wherein the instructions that when executed cause the processor to segment the electronic document, comprise further instructions that when executed cause the processor to clean hypertext markup language (HTML) tags from the body of the electronic document.

6. The system of claim 5, wherein the instructions that when executed cause the processor to segment the electronic document, comprise further instructions that when executed cause the processor to separate junk text from the body of the electronic document.

7. The system of claim 5, wherein the training of the expression prediction model further includes learning of types of language commonly associated with clean body text and junk text.

8. The system of claim 1, wherein the instructions that when executed cause the processor to generate labels for the features, comprises further instructions that when executed cause the processor to:
   generate a first sequence of labels for a plurality of features using a first model;
   generate a second sequence of labels for the plurality of features using a second model;
   iteratively use, at the second model, an output of the first model as augmented feature input to generate additional sequences of labels for the features using the second model, each iteration updating the augmented feature input to reflect output labels of a previous iteration, until a preconfigured convergence criteria is met.

9. The system of claim 1, wherein the instructions that when executed cause the processor to generate features for constituent tokens of the sentences, comprises further instructions that when executed cause the processor to analyze prefixes and suffixes of various lengths for the tokens to generate sub-word features, the constituent tokens being representative of words.

10. The system of claim 9, wherein the instructions that when executed cause the processor to generate features for constituent tokens of the sentences, comprises further instructions that when executed cause the processor to generate shape features regarding casing, length, and type of characters making up the constituent tokens for training the expression prediction model.

11. The system of claim 9, wherein the instructions that when executed cause the processor to generate features for constituent tokens of the sentences, comprises further instructions that when executed cause the processor to generate location features regarding a relative location of the constituent tokens within an encompassing sentence and a relative location of the encompassing sentence within an encompassing paragraph for training the expression prediction model.

12. The system of claim 9, wherein the instructions that when executed cause the processor to generate features for constituent tokens of the sentences, comprises further instructions that when executed cause the processor to generate cluster features for token embeddings and for document vectors for training the expression prediction model.

13. The system of claim 9, wherein the instructions that when executed cause the processor to generate features for constituent tokens of the sentences, comprises further instructions that when executed cause the processor to generate informative features via syntactic dependency parsing to recognize data patterns for training the expression prediction model.

14. The system of claim 9, wherein the instructions that when executed cause the processor to generate features for constituent tokens of the sentences, comprises further instructions that when executed cause the processor to generate token and/or sentence polarities indicating an interpreted sentiment, impact, or effect of the constituent tokens or the sentence for training the expression prediction model.

15. The system of claim 9, wherein the instructions that when executed cause the processor to generate features for constituent tokens of the sentences, comprises further instructions that when executed cause the processor to derive named entity features by locating and classifying named entities in the constituent tokens or a series of tokens for training the expression prediction model.

16. The system of claim 9, wherein the instructions that when executed cause the processor to generate features for constituent tokens of the sentences, comprises further instructions that when executed cause the processor to generate part-of-speech (POS) features to categorize the constituent tokens into syntactic categories representative of context for training the expression prediction model.

17. A method, comprising:
identifying, by a policy generation computer, a body of the electronic document;
separating, by the policy generation computer, the body of the electronic document into sentences;
tokenizing, by the policy generation computer, the sentences, and generating features for constituent tokens of the sentences including word features, shape features, syntactic features, N-gram syntactic features, and sentence-level features;
generating, by the policy generation computer, labels for the features in accordance with an iterative application of a plurality of machine learning models, labeled features being used for training an expression prediction model; and
identifying and locating expression varieties in subsequently received electronic documents using the expression prediction model.

18. The method of claim 17, further comprising, isolating, by the policy generation computer, text between the greetings and the signoff from the body of the electronic document.

19. The method of claim 18, further comprising, cleaning hypertext markup language (HTML) tags from the body of the electronic document.

20. The method of claim 19, further comprising separating, by the policy generation computer, junk text from the body of the electronic document, wherein the training of the expression prediction model further includes learning types of language commonly associated with clean body text and junk text.

* * * * *